United States Patent [19]

D'Agosto, III et al.

[11] Patent Number: 4,800,582
[45] Date of Patent: Jan. 24, 1989

[54] METHOD AND APPARATUS FOR CREATING AND STORING TELEPHONE DIRECTORY LISTINGS

[75] Inventors: Nicholas A. D'Agosto, III, Trumbull, Conn.; Steven M. Smith, Mahopac, N.Y.; Emil F. Jachmann, Greenwich, Conn.

[73] Assignee: Dictaphone Corporation, Stratford, Conn.

[21] Appl. No.: 895,001

[22] Filed: Aug. 8, 1986

[51] Int. Cl.⁴ .............................................. H04M 1/27
[52] U.S. Cl. ..................................... 379/216; 379/355; 379/354
[58] Field of Search ................. 379/216, 69, 355, 356, 379/360, 361, 40, 51, 354, 368

[56] References Cited

U.S. PATENT DOCUMENTS

| | | | |
|---|---|---|---|
| 3,433,428 | 3/1969 | Schatteman | 192/53 H |
| 3,467,790 | 9/1969 | Bolick, Jr. | 360/71 |
| 3,635,424 | 1/1972 | Morello | 242/683 |
| 3,758,726 | 9/1973 | Bolick, Jr. et al. | 242/198 |
| 3,779,498 | 12/1973 | Takashino | 242/204 |
| 3,790,722 | 2/1974 | Faye | 379/356 |
| 3,823,388 | 7/1974 | Chadima, Jr. et al. | 379/93 X |
| 3,834,651 | 9/1974 | Hashizume et al. | 242/199 |
| 3,842,433 | 10/1974 | Lemelson | 360/105 |
| 3,879,586 | 4/1975 | DuRocher et al. | 200/5 A |
| 3,885,108 | 5/1975 | Zock | 379/32 |
| 3,896,493 | 7/1975 | Ando | 360/96 |
| 3,903,369 | 9/1975 | Darwood | 379/77 |
| 3,914,551 | 10/1975 | Hunt | 379/79 |
| 3,916,121 | 10/1975 | Stuzzi | 360/13 |
| 3,920,926 | 11/1975 | Lenaerts et al. | 379/93 |
| 3,999,050 | 12/1976 | Pitroda | 364/419 |
| 4,007,491 | 2/1977 | Bolick, Jr. et al. | 360/74 |
| 4,029,908 | 6/1977 | Moseley et al. | 379/356 |
| 4,057,839 | 11/1977 | Banks | 360/93 |
| 4,115,846 | 9/1978 | Laine | 364/200 |

(List continued on next page.)

FOREIGN PATENT DOCUMENTS

| | | |
|---|---|---|
| 57-44361 | 1/1982 | Japan .................................. 379/355 |
| 1509285 | 5/1974 | United Kingdom . |
| 1529833 | 10/1974 | United Kingdom . |
| 2030423 | 9/1978 | United Kingdom . |
| 2012522 | 7/1979 | United Kingdom . |
| 2167272 | 11/1984 | United Kingdom . |
| 82/00392 | 2/1982 | World Int. Prop. O. .......... 379/356 |

OTHER PUBLICATIONS

Cygnet Communications CoSystem, Cygnet Technologies, Inc., brochure undated.
The Zymacom Information Exchange, Zymacom, Inc. brochure, 1985.

*Primary Examiner*—James L. Dwyer
*Attorney, Agent, or Firm*—Robert H. Whisker; Melvin J. Scolnick; David E. Pitchenik

[57] ABSTRACT

Telephone number information representing a name and a telephone number is entered into the memory of an automatic dialer, either by actuating a telephone dial-type keypad or by reading that information from a magnetic recording medium. When utilizing the keypad to generate telephone number information, actuation of the keys in one mode generates digital signals representing alphabetic characters constituting a name, and actuation of those same keys in a second mode generates digital signals representing numerical characters constituting the telephone number associated with that name. The telephone number information is stored as a telephone directory in record blocks which may be revised or deleted, in whole or in part, to carry out a telephone number edit operation. The stored record blocks may be read out from the memory and written onto the magnetic recording medium of a recorder, such as dictating machine, from which the recorded telephone directory may be downloaded to another automatic dialer. Several telephone instruments incorporating automatic dialers may be connected in a network having a central store in which telephone number information generated at each instrument is stored and at which the telephone number information stored in any or all of the memories of the telephone instruments may be revised.

50 Claims, 6 Drawing Sheets

OTHER PUBLICATIONS

| | | | |
|---|---|---|---|
| 4,212,438 | 7/1980 | Schatteman | 242/201 |
| 4,243,845 | 1/1981 | Feinberg et al. | 379/355 |
| 4,291,198 | 9/1981 | Anderson | 379/345 |
| 4,304,968 | 12/1981 | Klausner | 379/355 X |
| 4,306,117 | 12/1981 | Jacobson | 379/76 |
| 4,317,143 | 2/1982 | Osanai | 360/74.1 |
| 4,341,929 | 7/1982 | Alexander et al. | 379/355 X |
| 4,378,917 | 4/1983 | Negishi et al. | 242/186 |
| 4,422,114 | 12/1983 | Sugihara | 360/96.4 |
| 4,425,627 | 1/1984 | Eibner | 364/900 |
| 4,431,870 | 2/1984 | May et al. | 379/357 |
| 4,447,676 | 5/1984 | Harris et al. | 379/199 |
| 4,475,013 | 10/1984 | Lee et al. | 379/355 |
| 4,481,382 | 11/1984 | Villa-Real | 379/88 X |
| 4,482,085 | 11/1984 | Tanaka et al. | 226/187 |
| 4,482,786 | 11/1984 | Flynn, Jr. | 379/165 |
| 4,524,244 | 6/1985 | Faggin et al. | 379/93 |

METHOD AND APPARATUS FOR CREATING AND STORING TELEPHONE DIRECTORY LISTINGS

BACKGROUND OF THE INVENTION

This invention relates to telephone instruments, specifically instruments having telephone dialing devices and, more particularly, to a method and apparatus for storing, editing and reading out telephone number information stored in the telephone dialing device.

Automatic telephone dialing devices exhibit the well-known advantage of permitting rapid dialing of often-used telephone numbers. Such automatic dialing devices have been manufactured and sold as free standing devices that may be electrically connected to a conventional telephone instrument. These devices also have been integrally formed with such telephone instruments, such as so-called "memory telephones". Typically, a digital memory having a finite number of memory locations stores telephone number information therein. Such telephone number information usually consists only of a multi-digit telephone number and, when retrieved from the memory initiates a telephone dial-out operation of the retrieved number.

In some automatic dialing devices a plurality of keys are used to address corresponding memory locations. The simple actuation of a desired one of those keys results in the retrieval of the stored telephone number from the location addressed by the actuated key. To assist the user in identifying the telephone numbers that are stored in the respective memory locations, paper tabs, or inserts, are juxtaposed the respective keys; and it is expected that the user will write onto each paper tab the name of the individual whose telephone number is stored in the associated memory location.

In other automatic dialing devices, the usual keypad that is used to manually generate telephone numbers also is used to address the memory to retrieve the telephone number stored therein. For example, the telephone number stored in memory location 1 may be retrieved by operating the "1" key; the telephone number stored in memory location 2 may be retrieved by operating the "2" key, and so on. Typically, other keys are provided and must be actuated to enable the automatic dialing device to distinguish between a memory retrieval operation and a manual telephone dialing operation when the keypad is actuated. Unfortunately, means are not provided to display to the user the contents of the memory. Hence, the user cannot utilize such devices as telephone directories.

To generate telephone number information, the very same keypad which is used to manually dial a telephone number is actuated to load the memory with desired telephone numbers. As such telephone number information is generated, it is helpful to display each digit to verify its accuracy. In the event of an error, as noted by observation of the display, the erroneous digit or digits may be corrected. It also has been proposed in U.S. Pat. No. 4,341,929 to display, in addition to a numerical telephone number, alphabetic characters representing the name of the individual associated with that telephone number. Thus, both name and number information is stored and displayed. However, in this proposal, a separate alphabetic character keyboard is provided for the purpose of entering signals representing names.

Automatic dialing devices are particularly advantageous in a business office environment. A busy executive finds such devices most helpful when dialing often-used telephone numbers. However, in view of the relatively limited capacity of most dialing devices, the executive still must maintain a manual telephone directory at least of those telephone numbers which are used less often. Although dialing devices of significantly greater capacity have been proposed heretofore and are available, such devices often are auxiliary to the conventional telephone instrument, are bulky and consume a significant amount of limited desk-top space.

Another disadvantage of known automatic dialing devices resides in the fact that if an executive removes his office from one location to another, he often is supplied with a new telephone instrument and, perhaps, a new dialing device. Consequently, the information which had been entered into the automatic dialing device which he used previously must be re-entered into the new device. Obviously, this constitutes a time-consuming and laborious ministerial task. Heretofore, the rapid entry of telephone number information into automatic dialing devices has not been available. As will be described below, this particular disadvantage is readily overcome in accordance with the present invention.

Yet another disadvantage associated with dialing devices provided in a business office environment is the inability to transfer all or portions of a telephone directory listing from one dialing device to another. Although individual telephone instruments normally are included in a network in typical business office environments, the ability to utilize that network for the transfer of telephone information from one dialing device to another has not heretofore been exploited. Moreover, it is believed that no practical system is commercially available by which telephone directory listings derived from individual dialing devices may be stored at a central location, revised at that location and distributed, in whole or in part, among selected ones of the dialing devices included in the aforementioned network. This disadvantage also is overcome in accordance with the present invention.

There has been a desirability and need in the business office environment to integrate telephone instruments with recording equipment, such as dictating machines. In addition to recording messages dictated directly by a user thereof, such dictating machines also are used to record messages received over telephone lines. However, it is believed that an integrated system has not been made commercially available by which, in addition to recording voice messages, telephone-related data, such as telephone number directory listings, can be recorded on the recording medium of the dictating machine. Such an integrated system would permit the "copying" of directory listings from one telephone instrument to another simply by playing back the previously recorded directory listing into the automatic dialing device of the telephone instrument. Such "downloading" of telephone number information permits changes, revisions and updates to be made easily and quickly by or for a busy executive.

OBJECTS OF THE INVENTION

Therefore, it is an object of the present invention to provide an improved method and apparatus for utilizing and controlling automatic telephone dialing devices which address and overcome the aforementioned disadvantages.

Another object of this invention is to provide for the creation and entry of telephone number information into the memory of a telephone dialing device.

A further object of this invention is to provide for the rapid entry into the memory of a telephone dialing device of telephone number information read from a magnetic recording medium.

An additional object of this invention is to permit the editing, revising and modifying of a telephone directory listing stored in the memory of a telephone dialing device.

Another object of this invention is to provide a telephone instrument having a telephone dialing device incorporated therein wherein alphabetic characters representing a name and numerical characters representing a telephone number are generated by operating the telephone instrument keypad, such name and number information being stored in and displayed by the telephone instrument.

A still further object of this invention is to provide for the recording on a magnetic medium of telephone number information stored in the memory of a telephone dialing device, and also for the downloading of previously recorded telephone number information from the magnetic medium to the memory.

Yet an additional object of this invention is to provide, in a network of telephone instruments having telephone dialing devices, a central store of telephone number information which may be transferred, in whole or in part, to a selected one or more telephone instrument.

It is another object of this invention to provide a network and a central store, as aforementioned, wherein telephone number information at the central store may be modified or deleted, resulting in a corresponding modification or deletion of that telephone number information in selected telephone instruments.

Still another object of this invention is to provide a telephone/dictation terminal comprised of a dictating device and a telephone instrument, the latter having an automatic dialing device, wherein telephone number information that is stored in the memory of the telephone dialing device may be read out and recorded on the dictating machine and, conversely, previously recorded telephone number information may be played back from the dictating machine to the memory, thereby loading that memory with a telephone directory listing.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for entering telephone number information into the memory of a telephone dialing device, either by actuating a telephone dial-type keypad or by reading telephone number information from a magnetic recording medium. As one aspect of this invention, the telephone number information comprises alphabetic characters representing a name and numerical characters representing a telephone number associated with that name.

As a feature of this invention, the keys of the dial-type keypad are associated with numbers (e. g. "1", "2", "3". . ."0"), and some of these keys (i. e. keys "2"–"9") also are associated with letters (e. g. key "2" is associated with letters "A", "B" and "C", key "3" is associated with letters "D", "E" and "F", and so on). When operated in a first mode, the key representing both a number and letters first is actuated to generate a signal representing the first of the alphabetic characters associated therewith, and if that key is re-actuated, a signal representing the second alphabetic character is generated, and if the key is re-actuated once again, a signal representing the third alphabetic character is generated (e. g. when operating in this mode, if key "2" is actuated a first time, a signal representing the letter "A" is generated; when this key is actuated a second time, a signal representing the letter "B" is generated, and when this key is actuated a third time, a signal representing the letter "C" is generated). Further actuation of this key generates signals that represent still further, successive letters (e. g. continued actuation of key "2" results in signals representing the letters "D", "E", "F", and so on). When operated in a second mode, actuation of the key results in the generation of a signal representing the numeral associated with that key. Thus, name and telephone number characters are generated.

In accordance with yet another feature of this invention, the aforementioned name and number are displayed and if the user verifies the accuracy of the displayed information, the actuation of an ENTER key (or equivalent) results in the storage of the displayed information. Should an error be noticed in the displayed information, that error may be corrected before the displayed information is stored.

As yet another aspect of this invention, the stored name and number information may be read from the memory and displayed, either together or individually. For example, in one mode, only a stored name may be displayed. The user may delete, correct or revise the displayed name and number information merely by operating the keypad, as aforementioned, and the revised name and number information then may be stored or deleted from the memory.

An additional feature of this invention is the recording of stored telephone number information onto a magnetic recording medium. As one aspect of this feature, the telephone number information is stored as digital signals, and these digital signals are read out from the memory and used to modulate a tone signal, the resultant modulated tone signal then being recorded on the record medium. As yet another aspect, the telephone number information is stored in the memory as record blocks, each record block representing a name and a telephone number, and all of the record blocks (which comprise a directory listing) are read out of the memory and recorded as two duplicate directory listings on the record medium. As yet another aspect, as each record block is read from the memory and supplied to the tone modulator, it is checked for the presence of errors. In the event an error is detected, that record block is repeatedly supplied either a predetermined number of times or until it is error free, whichever occurs first. Should an error remain, that record block simply is not recorded.

As a further feature of this invention, when duplicate directory listings are recorded, as aforementioned, such as on a magnetic tape (e. g. a magnetic tape cassette), the magnetic tape may be played back at a subsequent time for the purpose of downloading the directory listing into the memory of another dialing device. In this regard, the first of the duplicate directory listings is played back from the record medium and checked for the presence of errors. If an error is detected in the played back directory listing, the second, duplicate directory listing is played back. In the event of an error in both the first and second duplicate directory listings, the telephone number information included therein is not stored in the memory. However, if no error is detected in the played back directory listing, the record blocks included therein are transferred, one block at a time, for writing into the memory. Each record block is error checked; and if an error is detected, repeated attempts are made to transfer an error-free record block into the memory. These repeated attempts are made a predetermined number of times or until no error is detected, whichever occurs first. In playing back one or both of the duplicate directory listings from the record medium, a demodulator is provided to demodulate the digital signal from the recorded modulated tone signal.

Still another feature of this invention is to provide the telephone dialing device in a network having a central store of telephone number information and, preferably, plural dialing devices. Selected telephone number information is transferred from the central store to a desired one of the telephone dialing devices, whereupon the transferred telephone number information is stored in the memory of that dialing device. As an aspect of this invention, the directory listing stored in each dialing device also is stored in the central store; and changes, revisions or deletions made at the central store to telephone number information results in a corresponding change, revision or deletion in the telephone number information stored in the dialing device. As another aspect of this invention, an entire directory listing may be transferred from the central store to the memory of a telephone dialing device connected in the network. Hence, a directory listing generated at one dialing device may be "copied" into another.

As still another feature of this invention, the telephone instrument in which the automatic dialing device is incorporated is coupled to a voice recorder, such as a dictating device. The telephone instrument may be used for normal telephone operation or for communicating audio signals to and from the recorder. A magnetic recording medium, such as a magnetic tape (e. g. a magnetic tape cassette) may be used by the recorder to record voice signals and, additionally, to record the directory listing stored in the memory of the automatic dialing device. The recorder also may used to download a directory listing, as aforementioned, from magnetic tape to the memory.

BRIEF DESCRIPTION OF THE DRAWINGS

The following detailed description, given by way of example, and not intended to limit the present invention solely to the embodiments shown herein, will best be understood in conjunction with the accompanying drawings in which.

DETAILED DESCRIPTION OF A CERTAIN PREFERRED EMBODIMENT

Figure 1:
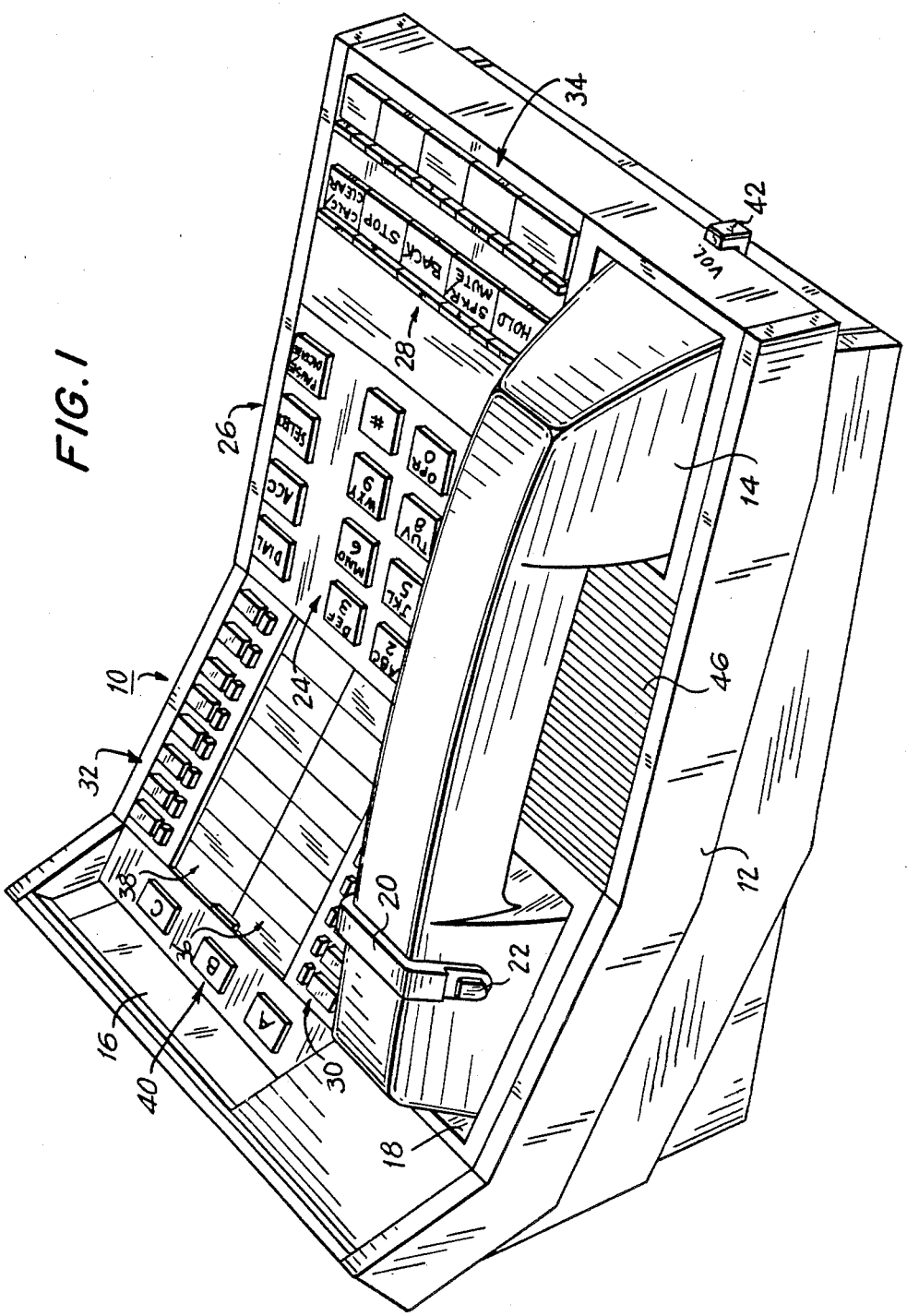
FIG. 1 is a perspective view of one embodiment of a telephone instrument in which the present invention finds ready application.
Figure 2:
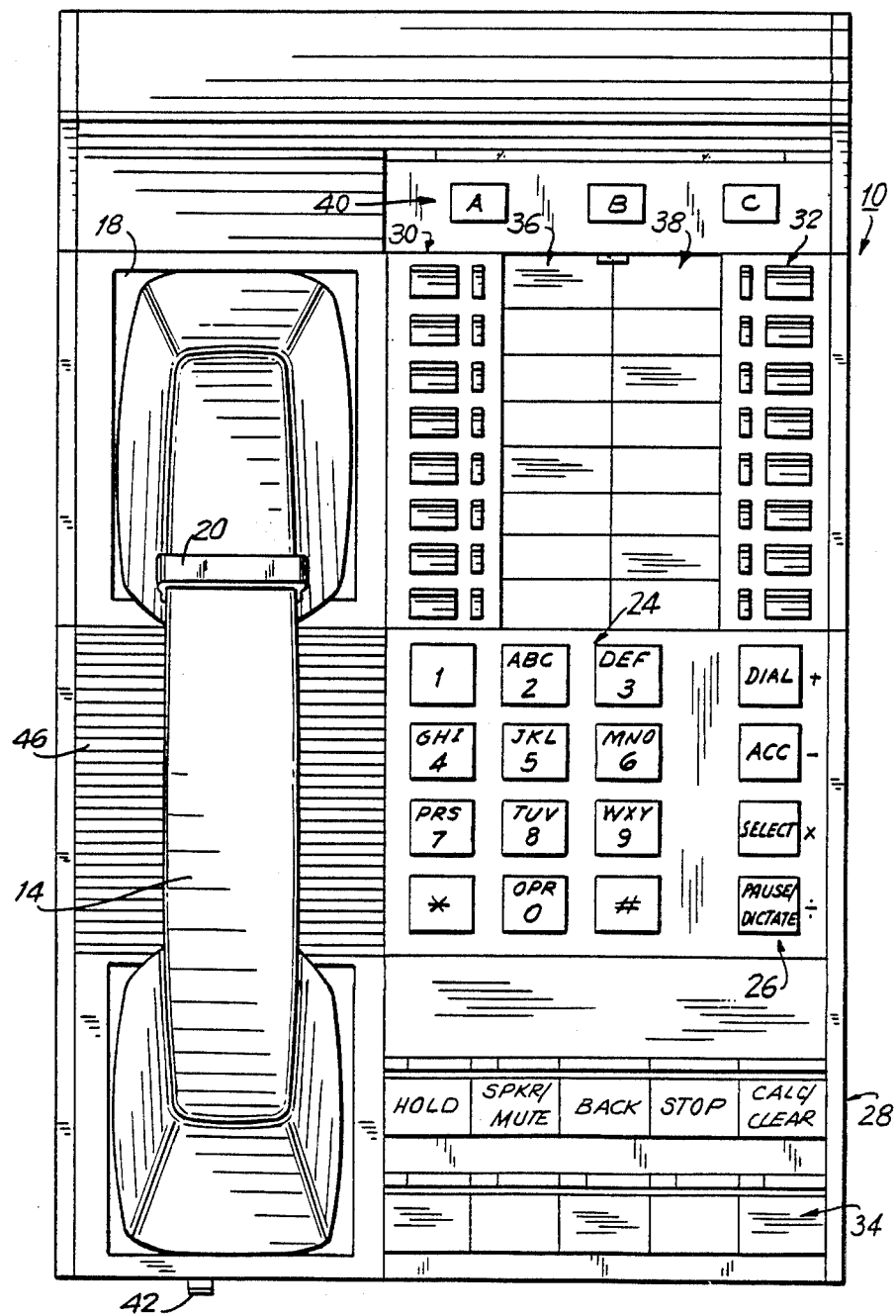
FIG. 2 is a top view of that telephone instrument.
Figure 3:
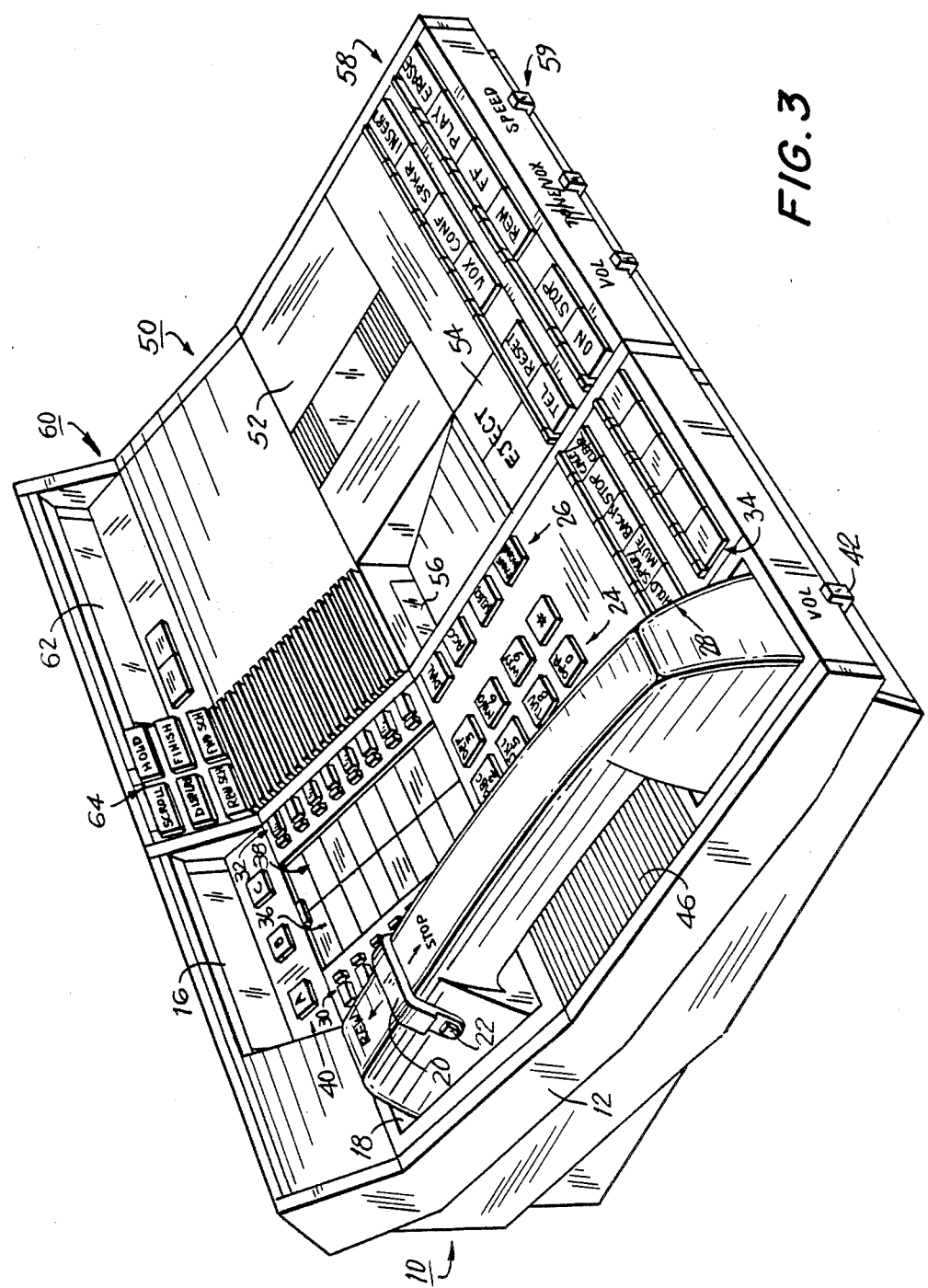
FIG. 3 is a perspective view of the aforementioned telephone instrument electrically and physically connected to a desk-top dictating machine.

The telephone instrument illustrated in FIG. 1 is described more particularly as a telephone/dictation terminal in copending application Ser. No. 895,017 filed Aug. 8, 1986, the disclosure of which is incorporated herein by reference. As disclosed therein, terminal 10 is operable as a telephone instrument and, when physically and electrically connected to a desk-top dictating machine, as shown in FIG. 3, the terminal also is operable to record voice messages on and reproduce voice messages from a recording medium, such as a magnetic tape cassette. In the interest of brevity, further detailed description of those portions of terminal 10 which are disclosed in the aforementioned application are not repeated herein. Suffice it to say that terminal 10 is provided, inter alia, with a dial-type keypad 24 formed of pushbuttons, or keys, designated "1"-"0", together with additional keys designated "*" and "#". Keypad 24 may be operated in a manner substantially identical to the operation of a conventional dial-type keypad normally found on commercially available telephone instruments. As is conventional, keys "1" and "0" are not provided with indicia representing letters, but keys "2"-"9" are provided with the following, conventional indicia:

2—ABC
3—DEF
4—GHI
5—JKL
6—MNO
7—PRS
8—TUV
9—WXY

Terminal 10 also is provided with a handset 14 which operates as a conventional telephone handset and, additionally, is provided with a dictation control yoke 20 and a dictation control button 22. The manipulation of the yoke and button provided on handset 14 effects a recording and playing back of voice signals when terminal 10 is used in conjunction with a desk-top dictating machine, as shown in FIG. 3 and as described more particularly in the aforementioned copending application.

Terminal 10 also is provided with preset function keys 26 and 28, user programmable keys 30, 32 and 34 and "soft" keys 40. Also provided is a display 16 adapted to provide alphanumeric indications to a user, the display preferably being formed as an LCD display capable of displaying two lines of alphanumeric characters, each line being capable of displaying sixteen characters. It will be appreciated from the aforementioned copending application that other alphanumeric displays may be provided, such as LED, fluorescent, incandescent and plasma displays.

The overall uses and operation of terminal 10 are described in detail in the aforementioned copending application. Additional description is set out herein to provide a ready understanding of the manner in which the present invention is incorporated into and utilized by the illustrated terminal.

Function keys 26 include a DIAL key which, when actuated, commands a dial-out operation. Terminal 10 includes automatic dialing means in accordance with the present invention, and as described below, the operation of which results in the display of a particular telephone number on display 16. Once a telephone number is displayed, the actuation of the DIAL key causes dialing signals in the form of tones (e.g. "Touch Tones") or dialing pulses associated with the displayed telephone number to be generated. Also, terminal 10 permits the automatic re-dialing of a telephone number that had last been dialed. Actuation of the DIAL key causes that last-dialed number to be displayed on display 16. Reactuation of the DIAL key results in the actual dialing of that displayed telephone number. A user may scroll through preceding telephone numbers that had been dialed previously by actuating a BACK key, as will be described below.

Also included in function keys 26 is an ACC key which, for example, may be actuated to initiate the operation of a telephone accessory (not shown) that may be connected to terminal 10. A SELECT key also is included in function keys 26, this SELECT key being operable during a telephone number programming mode, as will be described. For example, when entering desired telephone numbers for use by the automatic dialing means included in terminal 10, operation of the SELECT key is indicative of the end of a desired number (which may be, for example, a 2, 3, 4, 5 or 6-digit extension, a 7-digit "local" telephone number, a 10-digit long-distance telephone number or a multi-digit computer-accessed telephone number). Also, and as described in detail below, a directory of names may be stored in a memory included in the automatic dialing means of terminal 10, these names being spelled in a letter-by-letter basis, and each letter being selected by the actuation of a suitable key of keypad 24. The operation of the SELECT key indicates the entry of a desired letter and the dual operation of this key indicates the end of an entered name.

Function keys 26 also include a DICTATE/PAUSE key which, when actuated, places terminal 10 in a dictate or transcribe mode of operation by which audio messages may be dictated onto a desk-top dictating machine coupled to terminal 10, as shown in FIG. 3. This key also may be operated while a telephone number is being generated and stored in the memory of the automatic dialing means included in terminal 10 for the purpose of imparting a "pause" in the dial-out operation, as may sometimes be necessary. For example, in some PBX systems, a "pause" to permit dial tone detection may be necessary in order to complete a dial-out operation.

Function keys 26 also may operate to carry out various arithmatical functions, such as addition, subtraction, multiplication and division, as indicated, when keypad 24 is operated as a calculator.

Function keys 28 are described in the aforementioned copending application. Of these keys, reference is made to the BACK and to the STOP key which may be used in conjunction with the present invention. The BACK key, when actuated, effects a backward scrolling of telephone directory information that may be displayed on display 16. Each directory entry, which is formed of alphabetical characters representing a name and numerical characters representing a telephone number associated with that name, the combination of the name and telephone number being referred to herein as telephone number information, may be displayed, and a user of terminal 10 may scroll through those entries by operating the BACK key. The BACK key effects other operations in different modes, such other operations being described more particularly in the aforementioned copending application.

As disclosed in the aforementioned copending application, terminal 10 includes a microprocessor which may be, for example, of a type similar to Hitachi Model 6303.The STOP key, when actuated, terminates whatever routine then is being executed by the microprocessor included in terminal 10. Thus, and as will be described, if the STOP key is actuated while telephone number information is being generated for storage in the memory of the automatic dialing means, such telephone directory creation is terminated.

User programmable keys 30 and 32 are arranged in two columns, as illustrated. As a numerical example, each column includes eight separate keys and, typically, each key may be programmed to initiate the dialing of a predetermined telephone number, as will be described. Other functions may be assigned to respective ones of these keys, as described in the aforementioned copending application. Adjacent keys 30 is a column of paper inserts 36 and adjacent keys 32 is a column of paper insets 38. (If desired, the two side-by-side columns may be of unitary construction.) Typically, the user will inscribe the paper inserts with information relating to the particular function that has been assigned to an adjacent key. For example, the identity of a telephone number with which one of those keys is programmed may be inscribed on its associated paper insert. Alternatively, the identity of an individual whose telephone number is assigned to that key may be inscribed.

Programmable keys 34 are similar to programmable keys 30 and 32 and, likewise, individual telephone numbers may be assigned to respective ones of keys 34. The actuation of a key that has been assigned with a telephone number results in the reading out of the memory included in the automatic dialing means of terminal 10 of the assigned telephone number and the dialing of that number. Preferably, but not necessarily, the read out telephone number may be displayed on display 16. It will be appreciated that the directory entries are stored in digital form, with each alphabetic character and each numerical character being represented by a multi-bit digital signal, as is conventional.

Operation of the programmable keys may be "nested". For example, it may be desired to store and automatically dial a telephone number whose composite digits exceed the total number of digits that may be associated with a single programmable key. This might occur if the telephone system with which terminal 10 is used requires a three-digit code to access a trunk line, followed by a seven-digit code to access a discount telephone carrier (such as MCI, Sprint, etc.), followed by a six-digit identifying code, followed by a ten-digit telephone number. In that event, a predetermined one of the programmable keys may be assigned with the first sixteen digits mentioned above, and the other programmable keys may be assigned with desired telephone numbers preceded by a "prefix" code that automatically dials all of the digits assigned to the predetermined programmable key before dialing the digits assigned to the programmable key that is actuated. Such nesting of the programmable keys is not limited only to two keys. Any reasonable number of keys may be "linked" such that telephone number information that has been assigned to each linked key is recalled and dialed merely upon actuating the last of the linked keys. Thus, and as another example, four keys may be linked with the first key being assigned with a multi-digit (including one or more "pause" representations) trunk line access code, the second key being assigned with a "toll-free" telephone number, the third key being assigned with a "pause" representation and a subscriber's ID number, and the fourth key being assigned with a prefix code to recall the information assigned to keys one, two and three, plus a desired telephone number.

"Soft" keys 40 with which terminal 10 is provided are designated keys A, B and C. As is understood by those of ordinary skill in the art, a "soft" key cooperates with a microprocessor to supply different commands and functions to that microprocessor, depending upon the particular routine which is in the process of being executed. That is, a soft key is not dedicated to a particular, predetermined function or command, for all routines and for all operating states of the microprocessor. A given soft key, such as key A, may be operated a first time to represent a first command and then, as the microprocessor continues its routine, it may be operated a second time to represent a second, different command. Preferably, soft keys 40 are aligned with display 16 and cooperate with that display and with the microprocessor included in terminal 10 such that the operation of selected ones of these soft keys enables the microprocessor to continue with a particular routine then being executed. The manner in which soft keys 40 are operated to carry out and control the creation and storage of directory entries in the memory of the automatic dialing means included in terminal 10 will be explained in greater detail hereinbelow in conjunction with the flow chart of FIG. 5.

Terminal 10 may be used as a so-called "stand alone" telephone instrument having an automatic dialing means and a telephone directory storage means, as mentioned above and as described in greater detail below. To best utilize the various features included in this terminal, it is contemplated that the terminal be electrically and physically connected to a desk-top dictating machine. A preferred embodiment of a telephone/dictation terminal comprised of terminal 10 and a desk-top dictating machine, referred to as a record/playback module, is illustrated in FIG. 3. The illustrated telephone/dictation terminal thus is comprised of terminal 10, record/playback module 50 and a display module 60. The record/playback module is adapted to carry out typical dictating functions by which audio messages may be recorded on and reproduced from a record medium, such as a magnetic tape. In the preferred embodiment, the magnetic tape is housed in a suitable cassette, such as a standard cassette, a minicassette, a microcassette or a picocassette of the type described in, for example, U. S. Pat. No. 4,443,827, assigned to the assignee of the present invention. Other record media also may be used, such as magnetic disks or magnetic belts, and solid-state storage devices, such as magnetic bubble arrays, semiconductor memory chips, and the like, also are contemplated. As will be described, the magnetic tape on which audio messages are recorded also may be used to record the telephone directory listing of the telephone number information stored in the memory of terminal 10. Thus, one user's directory listing, after being recorded on a magnetic tape cassette, may be downloaded into the memory of any other terminal 10, thereby facilitating a change in offices or locations by a busy executive without requiring him to "re-program" the automatic telephone dialing device included in his telephone instrument, and also providing a "backup" in the event that the memory in which an executive's directory listing is stored is inadvertently erased. Furthermore, this desirable feature of recording and downloading directory listings facilitates the ready interchange of telephone number information from one co-worker to another in a business office environment. For example, often-used telephone numbers that may be called by several co-workers, as well as intra-office telephone extensions of different co-workers may be prepared on a master cassette and updated periodically; and that cassette then may be played back in respective record/playback modules to download such telephone number information into the memories of respective terminals 10. Thus, each co-worker's telephone directory may be updated and kept current with pertinent telephone number information without requiring manual re-programming of the directory listing in each terminal. It will be appreciated that this directory listing downloading feature may dispense with the need to produce and circulate numerous "hard" copies of intra-office (as well as inter-office) telephone directories.

Record/playback module 50 may be of the type described in copending application Ser. No. 895,006, filed: Aug. 8, 1986, the disclosure of which is incorporated herein by reference. Display module 60, which is electrically and physically connected to module 50, provides visual indications of the type of messages which are recorded by module 50, and also provides information relating to the activity of this module. Display module 60 is described in copending application Ser. No. 894,993, filed: Aug. 8, 1986, the disclosure of which also is incorporated herein by reference. It will be appreciated that display module 60 and display 16 are separate and distinct display devices.

As described in application Ser. No. 894,993, display module 60 has included therein a modulator and a demodulator for the purpose of recording and recovering certain digital signals on the same magnetic tape that normally is used in record/playback module 50 for dictation. These digital signals represent information relating to the audio messages which are dictated, such as the type of each message (e.g. a letter, a "priority" letter, an instruction or a "special note"), the location on the tape at which each message is recorded, the time and date of recording and the identity of the author who recorded them. Such digital signals are used to modulate a tone signal within the audio frequency band; and in the described embodiment, FSK modulation/demodulation is used. As will be described below, the same tone modulator and tone demodulator included in display module 60 operates on the digital signals which are generated to represent telephone information, and the resultant modulated tone signals are recorded on and reproduced from magnetic tape by record/playback module 50. Thus, the telephone directory listing stored as digital signals in the memory of terminal 10 is recorded as a modulated tone signal(s), such as FSK signals, on magnetic tape. During a downloading operation, as described below, the tone modulated signals representing the recorded directory listing are played back from the magnetic tape, demodulated by the tone demodulator included in display module 60, and then written into the memory of terminal 10.

Although the aforementioned tone modulator and tone demodulator are included in display module 60 (for reasons which are not pertinent to the present invention), it will be readily appreciated that, in an alternative embodiment, a modulator and demodulator may be provided in terminal 10 or in record/playback module 50. While display module 60 enhances the operation of the record/playback module during dictation and transcription, this display module is not necessary for satisfactory operation of terminal 10 in combination with record/playback module 50.

Terminal 10, whether disposed as a "stand alone" device or connected to a record/playback module so as to comprise a telephone/dictation terminal, may be connected in a network with other similar terminals, as described in copending application Ser. No. 895,017 and also in copending application Ser. No. 895,010, filed: Aug. 8, 1986, the disclosures of which are incorporated herein by reference. In such a network, and as described in application Ser. No. 895,017, terminal 10 is connected by a digital communication link to a central station, such as a supervisory console. The digital communication link functions as a bus to which other similar terminals are connected. Preferably, a microcomputer is located at the supervisory console for the purpose of monitoring the activity at each telephone/dictation terminal and also to communicate text messages between the microcomputer and a terminal. The microprocessor included in terminal 10 is programmed to interact with the microcomputer at the supervisory console such that telephone number information stored in the memory at terminal 10 also may be transmitted to and stored at the microcomputer. Thus, the directory listing stored in each terminal also may be stored at the microcomputer in what is referred to herein as a central store. A suitable identifier, which designates the terminal or terminals from which each directory listing originated, also is stored at the central store. Thus, in addition to storing the telephone number information (comprised of an individual's name and telephone number associated with that name), the central store also stores the identification of the terminal whose memory contains that telephone number information. Any changes, revisions or deletions of telephone number information effected at the central store results in the same change, revision or deletion of that telephone number information stored in the memory of the identified terminal. Furthermore, additions that are made at the central store to a directory listing that was created at a particular terminal results in the same addition to the directory listing stored in the memory at that terminal. Still further, a directory listing stored in the central store and derived from one terminal may be "copied" into the memory at another terminal in response to a simple keyboard operation at the central store. Such manipulation of telephone number information at the central store which results in corresponding changes in the telephone number information stored at a terminal 10 is described below and is also described in aforementioned copending application Ser. No. 895,010.

Figure 4:
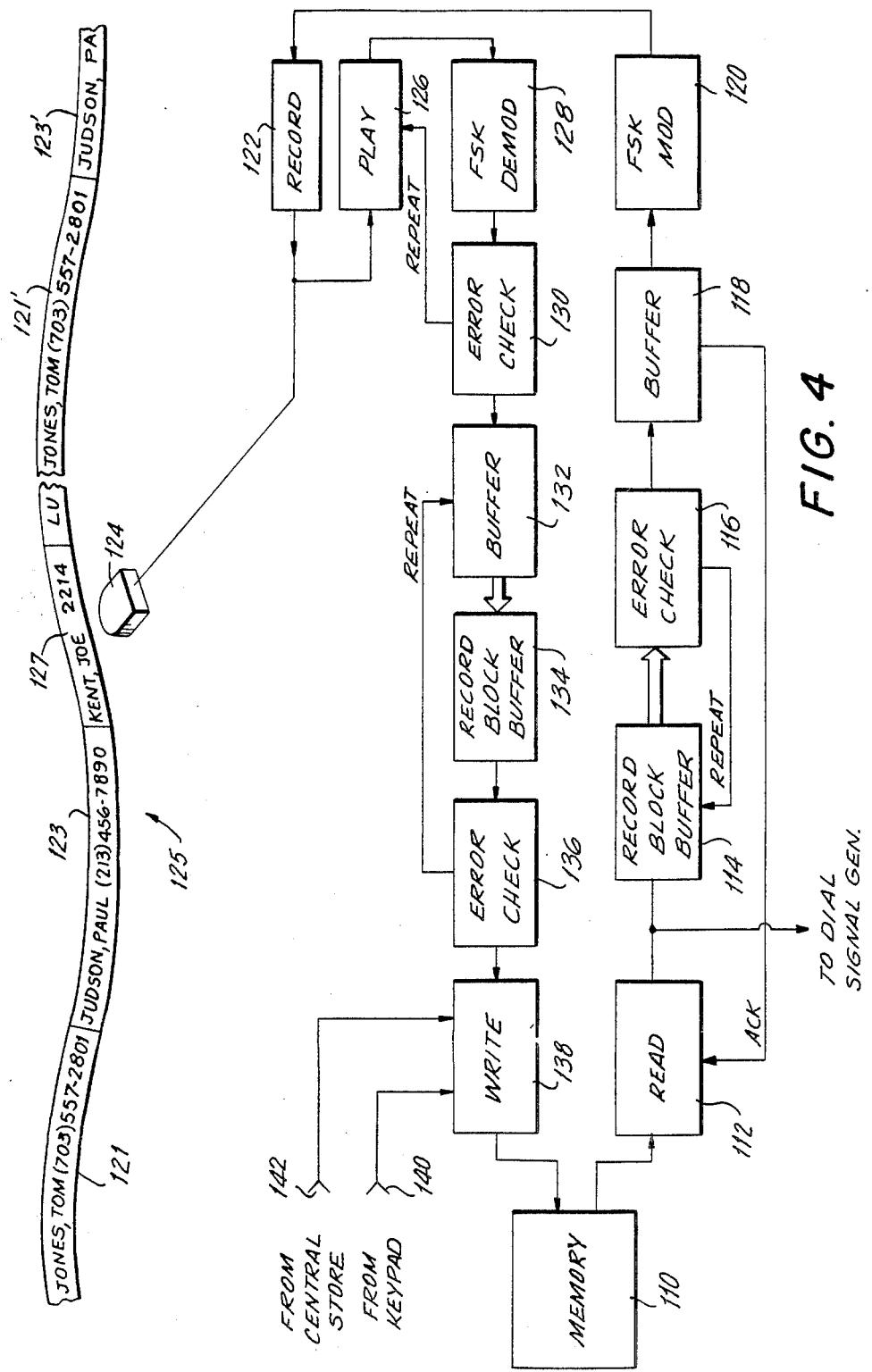
FIG. 4 is a block diagram of one embodiment of a novel feature of the present invention.

The manner in which a directory listing is created and stored in the memory of terminal 10 will be described below in conjunction with the flow chart shown in FIG. 5. The manner in which a directory listing is read from that memory and recorded on a magnetic recording medium, such as a magnetic tape, and the manner in which a previously recorded directory listing is downloaded from such recording medium to the memory now will be described in conjunction with the block diagram shown in FIG. 4. For convenience, the operation of reading a directory listing from the memory and recording that directory listing on magnetic tape is referred to herein as "uploading" the directory listing. FIG. 4 illustrates an uploading channel and a downloading channel, both being coupled to the memory included in terminal 10, this memory being identified as memory 110. It is assumed that memory 110 has a capacity sufficient to store, for example, one hundred directory entries. For the purpose of the present description, a directory entry is comprised of alphabetic characters representing a name and numerical characters representing a telephone number associated with that name. It is appreciated that the alphabetic and numerical characters are represented in digital form, and conventional codes represent each letter "A"-"Z" and each numeral "1"-"0". In addition, a comma that is used to separate an individual's last name from his first name may be represented, when in the name-entry mode, by actuating key "0". A space (e. g. a space between last and first names or between the words of a corporate name, such as Patent Office) may be represented by dual actuation of key "0". This provides a clear, user-acceptable display of a directory entry name. In one embodiment, each directory entry is stored in an addressable location of memory 110 in the form of a "record block". All of the record blocks stored in memory 110 comprise a directory listing.

The uploading channel coupled to memory 110, and shown in FIG. 4, is comprised of read circuitry 112, buffer circuits 114 and 118, a tone modulator 120 and record circuitry 122. This uploading channel extends to a record/playback head 124 in record/playback module 50 which, as will be described, records the record blocks stored in memory 110 onto magnetic tape 125. The recorded record blocks are illustrated in FIG. 4 as record blocks 121, 123, 127, etc. It will be appreciated that magnetic tape 125 may comprise a conventional audio magnetic tape which, in the preferred embodiment, is housed in a cassette, as aforementioned.

Read circuitry 112 is coupled to memory 110 and comprises a conventional read-out circuit adapted to read out one record block at a time from the memory. Although not shown in FIG. 4, it will be appreciated that read and write operations to read record blocks from and write record blocks into memory 110 are controlled by a microprocessor, such as Hitachi Model 6303. Read circuitry 112 is coupled to a dial signal generator such that, when terminal 10 is used to effect a dial-out operation, the numerical characters which comprise the telephone number portion of a read out record block are supplied to the dial signal generator, whereupon the read out telephone number is dialed automatically. Such reading out from a memory of characters representing a telephone number and the automatic dialing of that telephone number is known to those of ordinary skill in the art. The manner in which the microprocessor included in terminal 10 controls the dial-out operation is described in aforementioned copending application Ser. No. 895,017.

The output of read circuitry 112 also is coupled to buffer 114. In the preferred embodiment, buffer 114 has a capacity sufficient to store at least one complete record block; and this buffer is disposed in terminal 10. Buffer 114 is coupled by a bus to an error detector 116 which, in the preferred embodiment, is provided in display module 60. The error detector may comprise, for example, an ECC error detector which functions to detect errors, if any, in the record block transmitted thereto from buffer 114. A feedback connection between error detector 116 and buffer 114 is illustrated, this feedback connection serving to supply a "repeat" signal to the buffer in the event that an error is detected in the record block transmitted therefrom. The purpose of this "repeat" signal is to initiate a re-transmission of the erroneous record block, as described below.

Error detector 116 is coupled to buffer 118. In one embodiment, this buffer has a capacity sufficient to store a complete directory listing. It will be appreciated that, although one record block at a time is read out of memory 110, buffer 118 stores all of the record blocks which comprise a directory listing. A feedback connection is illustrated from buffer 118 to read circuitry 112. The purpose of this feedback connection is to supply an acknowledgement signal ACK from buffer 118 to the read circuitry upon each successful receipt by the buffer of an error-free record block. Upon receipt of the ACK signal, read circuitry 112 then reads out the next record block from memory 110. It will be appreciated that a subsequent record block is not read from the memory in the absence of an ACK signal.

Buffer 118 is coupled to tone modulator 120 which, in the preferred embodiment, comprises an FSK modulator. The directory listing stored in buffer 118 is supplied, one record block at a time, to the FSK modulator whereat a tone signal is modulated in accordance with the digital signals supplied thereto from the buffer. If desired, the ACK signal may be returned from buffer 118 to read circuitry 112 each time a record block is transferred from buffer 118 to tone modulator 120. In this alternative embodiment, the storage capacity of buffer 118 need be equal only to the storage capacity of buffer 114, that is, sufficient to store only one record block. In this alternative embodiment, one record block is read from memory 110, temporarily stored in buffer 114, supplied to buffer 118 via error detector 116 and then transferred from buffer 118 to tone modulator 120. Then, the ACK signal is returned to read circuitry 112, whereafter the next record block is read from memory 110. In the event that an error is detected in the record block supplied from buffer 114, error detector 116 returns the repeat signal to buffer 114 to initiate a re-supply of the record block stored in that buffer, as will be described.

Tone modulator 120 is coupled to record circuitry 122, whereupon the digitally modulated tone signal is applied to record/playback head 124 for recording on magnetic tape 125. As depicted in FIG. 4, record blocks 121, 123 and 27 are comprised of signals representing alphabetic characters which constitute the name of an individual, followed by signals representing numerical characters which constitute the telephone number associated with that individual. Hence, telephone number information is recorded on tape 125 as modulated tone signals (preferably, FSK modulated tone signals).

The downloading channel illustrated in FIG. 4 extends between record/playback head 124 and memory 110. The purpose of this downloading channel is to read previously recorded telephone number information from magnetic tape 125 and to write that telephone number information into the memory. The downloading channel is comprised of playback circuitry 126, a tone demodulator 128, buffers 132 and 134, an error detector 136 and write circuitry 138. Playback circuitry 126 is coupled to record/playback head 124 and may comprise conventional circuits known to those of ordinary skill in the art for use in reproducing audio signals from a record medium. Playback circuitry 126 is coupled to tone demodulator 128. This tone demodulator is compatible with and complementary to tone modulator 120. Hence, in the embodiment described herein, demodulator 128 comprises an FSK demodulator. It is appreciated that digitally modulated tone signals which are reproduced from tape 125 by head 124 are demodulated to recover digital signals representing the recorded telephone number information.

Demodulator 128 is coupled to buffer 132 by an error detector 130. Error detector 130 may comprise a conventional check sum arrangement by which the digits included in a complete directory listing read from tape 125 are summed and compared to a predetermined value. Should the summation of these digits differ from that predetermined value, an error is present in one or more of the digits included in the directory listing. As shown, a feedback connection is provided between error detector 130 and playback circuitry 126, whereby a "repeat" signal is supplied to the playback circuitry in the event that the check sum arrangement included in error detector 130 detects an error in the reproduced directory listing. As will be described below, during an "uploading" operation, duplicate directory listings are recorded on tape 125. Normally, during a downloading operation, only the first of these duplicate directory listings is reproduced from the tape. However, in the event that error detector 130 senses an error in the reproduced directory listing, the repeat signal supplied to playback circuitry 126 is used to effect the reproduction of the second duplicate directory listing recorded on the tape. In the absence of a detected error, the second duplicate directory listing is not reproduced.

Buffer 132 preferably has a capacity sufficient to store all of the record blocks included in one complete directory listing. If an error is detected in the first of the duplicate directory listings reproduced from tape 125, that directory listing, which is stored in buffer 132, is not further utilized (i. e. it is ignored). The contents of the buffer are replaced by the second of the duplicate directory listings reproduced from the magnetic tape. However, if error detector 130 detects an error in the second of the duplicate directory listings, a suitable error indication is provided and the erroneous directory listing is not written into memory 110.

Buffer 132, which may be disposed in display module 60, is coupled to buffer 134 which, in turn, is disposed in terminal 10. In the preferred embodiment, the capacity of buffer 134 is sufficient to store simply one record block. It will be appreciated, therefore, that buffer 132 supplies one record block at a time to buffer 134. Buffer 134 is coupled to write circuitry 138 by error detector 136. This error detector may be similar to aforementioned error detector 116 and, for example, may include an ECC circuit. Thus, each successive record block stored in buffer 134 is examined for errors. A feedback connection is provided between error detector 136 and buffer 132 to supply a "repeat" signal to buffer 132 in the event that an error is detected in a record block. If such an error is detected, that record block is resupplied from buffer 132 to buffer 134 in a manner described below. In the absence of an error, the record block that is stored in buffer 134 is supplied by write circuitry 138 to memory 110. Thus, each record block that is reproduced from tape 125 is demodulated, error detected and stored in a respective addressable location in memory 110.

FIG. 4 also illustrates that write circuitry 138 is coupled to an input 140 and also to an input 142. Input 140 supplies to write circuitry 138 the digital signals constituting telephone number information which are generated in response to the operation of keypad 24, as will be described. Input 142 supplies to the write circuitry digital signals representing telephone number information derived from the aforementioned central store. Thus, write circuitry 138 supplies to memory 110 telephone number information that is reproduced from tape 125, that is generated in response to the operation of keypad 24 or that is produced at the central store (e. g. in response to revising, modifying, erasing or "copying" telephone number information, as mentioned above and as described in copending application Ser. No. 895,010).

The manner in which the uploading and downloading channels operate to transfer telephone number information between memory 110 and magnetic tape 125 now will be described. Let it be assumed that an uploading operation is to be carried out. It is assumed that, for example, a magnetic tape cassette is loaded into record/playback module 50, and a selected one of soft keys 40 then may be operated, as described below in conjunction with the flow chart of FIG. 5. Each memory location in which a record block is stored is read out by read circuitry 112, one record block at a time. The read out record block is stored temporarily in buffer 114 and then supplied to buffer 118 via error detector 116. In the absence of an error in the record block transferred from one buffer to the other, the record block now stored in buffer 118 is applied to tone modulator 120 for the recording of that record block on magnetic tape 125 as a digitally modulated (e.g. FSK) tone signal. Buffer 118 also returns the ACK signal to read circuitry 112, and the next record block is read from memory 110. This operation continues until all of the record blocks included in the directory listing stored in memory 110 are recorded on magnetic tape 125, as illustrated schematically by record blocks 121, 123 and 127. In one embodiment, the aforementioned operation is carried out once again, whereby read circuitry 112 again reads out the directory listing stored in memory 110, one record block at a time, to record the very same directory listing in duplicate form on magnetic tape 125, as represented by duplicate record blocks 121' and 123'. This duplicate recording of the directory listing is used as a "backup" in the event that, upon downloading the directory listing from magnetic tape 125, an error in the recovered record blocks is detected. In most instances, such an error is caused by defects associated with the magnetic tape; and it is expected that such defects, although present in one recorded directory listing might not be present in the other.

The foregoing has assumed that the record block transferred from buffer 114 to buffer 118 is error free. However, if an error in this record block is detected by error detector 116, the repeat signal is returned to buffer 114 by the error detector. In response to this repeat signal, the next successive record block is not read from memory 110 but, rather, the record block which remains temporarily stored in buffer 114 is repeatedly supplied to buffer 118. As repeated attempts are made to transfer an error-free record block to buffer 118, error detector 116 senses the presence of an error in each repeatedly transferred record block. This repeat operation is carried out a predetermined number of times or until no error is detected in the record block, whichever occurs first. In the event that an error signal is detected in the repeated attempts to transfer the record block, that record block is ignored (it is not recorded) and read circuitry 112 reads out the next successive record block from memory 110. Hence, the record block which had been stored temporarily in buffer 114 now is replaced by the newly read out record block.

As an alternative for the predetermined number of repeated attempts to transfer a record block from buffer 114 to buffer 118, a timer may be triggered on the first attempt to transfer the record block, and if an error is detected therein, repeated attempts are made until either the timer times out or an error-free record block is transferred, whichever occurs first.

In the embodiment described, the capacity of buffer 118 has been assumed to be equal to that of buffer 114, that is, sufficient to store temporarily one record block therein. The ACK signal is returned to read circuitry 112 when the record block temporarily stored in buffer 118 is applied to tone modulator 120. As an alternative, the capacity of buffer 118 may be sufficient to store all of the record blocks included in a directory listing, and the ACK signal may be returned to read circuitry 112 after each error-free record block is received by buffer 118. Then, when an entire directory listing is stored in buffer 118, the record blocks may be read out therefrom, one record block at a time, to modulator 120.

As a further alternative to the operation described above, if the capacity of buffer 118 is sufficient to store an entire directory listing, the contents of this buffer may be read out two successive times to effect the duplicate recording of the directory listing. That is, the contents of memory 110 need not be read out once again to record the second of the duplicate directory listings. Rather, the directory listing stored temporarily in buffer 118 may be retained therein for a duration at least sufficient to effect such duplicate directory listing recordings.

Let it now be assumed that the directory listing recorded on magnetic tape 125 is to be downloaded into memory 110 of terminal 10. Assuming once again that the magnetic tape is housed within a cassette, the tape cassette is loaded into record/playback module 50 and an appropriate one of soft keys 40 is actuated, as described below in conjunction with the flow chart shown in FIG. 5. As a result, tape 125 is transported past head 124, and the first of the duplicate directory listings is reproduced therefrom. Each modulated record block that is reproduced from the magnetic tape is demodulated by demodulator 128, and the recovered digital signals are supplied, via error detector 130 to buffer 132. In the preferred embodiment, all of the record blocks included in the first directory listing are reproduced in succession, demodulated and checked for errors. The capacity of buffer 132 is assumed herein to be sufficient to store all of the record blocks included in a directory listing, and such record blocks are stored temporarily therein. In the event that no errors are detected by error detector 130 in the directory listing supplied to buffer 132, the record blocks stored in this buffer are in condition to be transferred, one record block at a time, to buffer 134. However, if an error is detected in the recovered directory listing, usually due to one or more defects in magnetic tape 125, the repeat signal is supplied to playback circuitry 126 by error detector 130.

In response to the repeat signal supplied thereto, playback circuitry 126 operates to reproduce the second of the duplicate directory listings from magnetic tape 125. As before, the successive record blocks which are reproduced are demodulated, error detected and stored temporarily in buffer 132. It is appreciated that, in the event of an error detected in the first of the duplicate directory listings reproduced from magnetic tape 125, the contents of buffer 132, that is, the record blocks stored therein, are replaced by the record blocks reproduced from the second of the duplicate directory listings. Now, however, if an error is detected in the second of the duplicate directory listings reproduced from tape 125, an error indication is provided and the reproduced directory listing is not written into memory 110.

Let it be assumed that no error is detected in the record blocks stored in buffer 132. That is, the first or second of the duplicate directory listings is considered to be substantially error-free. Now, the first of these record blocks is transferred to buffer 134; and error detector 136 senses the presence of an error in the record block now stored temporarily in buffer 134. As mentioned above, error detector 136 may carry out an ECC detecting scheme. If no error is detected in the record block stored temporarily in buffer 134, this record block is supplied to write circuit 138 and written into an addressed location of memory 110. Then, the next record block stored in buffer 132 is transferred to buffer 134, and the foregoing error-detecting and record block write-in operation is carried out. As a result, all of the error-free record blocks which are reproduced from magnetic tape 125 are loaded into memory 110. The memory thus is supplied with telephone directory information which may have been recorded at some other location. It is appreciated that this telephone number information is loaded into the memory substantially without operator intervention.

However, if the record block stored temporarily in buffer 134 contains an error, as detected by error detector 136, the repeat signal is returned from the error detector to buffer 132. In response to this repeat signal, repeated attempts are made to transfer to buffer 134 an error-free replacement for the record block stored therein. In one embodiment, a predetermined number of repeated attempts are made until that record block is received error-free, whichever event occurs first. Alternatively, a timer is triggered when the record block is transferred from buffer 132 to buffer 134, and the aforementioned repeated attempts are made until either the record block is received error free or the timer times out, whichever occurs first. In either embodiment, if an error still is present in the record block stored in buffer 134, that record block is ignored and is not supplied to write circuit 138. Rather, the next successive record block stored in buffer 132 is read out therefrom, and this next record block replaces the erroneous record block stored in buffer 134.

As yet another alternative, buffer 134 may exhibit a capacity sufficient to store all of the record blocks included in a complete directory listing. In that event, error detector 136 senses whether an error is present in each record block transferred from buffer 132 to buffer 134. Assuming that all of the record blocks which had been supplied to buffer 132 are transferred to buffer 134, the directory listing temporarily stored in this buffer then is written, one record block at a time, into respective addressable locations of memory 110. However, if an erroneous record block is detected, the aforementioned repeat operation is carried out in an attempt to replace that erroneous record block with an error-free version thereof in buffer 134. Erroneous record blocks are not written into memory 110.

In the preferred embodiment, it is assumed that memory 110 has a capacity sufficient to store 100 record blocks. Each record block is formed of 16 alphabetic characters and 16 numerical characters. Accordingly, in this embodiment, 100 record blocks are uploaded or downloaded, even if some or most of those record blocks contain no useful telephone number information (i. e. they are "blank"). Also, all thirty-two characters included in a record block are transferred, even if some of those characters are "blank" (i. e. they do not contain alphabetic or digital characters). In an alternative embodiment, only those record blocks which contain telephone number information are uploaded or downloaded. It will be appreciated that the capacity of memory 110 may be increased or decreased to store a greater or lesser number of record blocks; and, likewise, the number of alphabetic characters which may be used to represent an individual's name and/or the number of numerical characters which may be used to represent the telephone number associated with that name may be greater or less than 16 characters apiece.

In the preferred embodiment, read circuitry 112 operates under microprocessor control to read from memory 110 the telephone number information stored therein in alphabetical order. Thus, in accordance with this preferred embodiment, and as represented in FIG. 4, the record blocks are recorded on magnetic tape 125 in accordance with the alphabetical order of the names stored in the memory.

Figure 5:
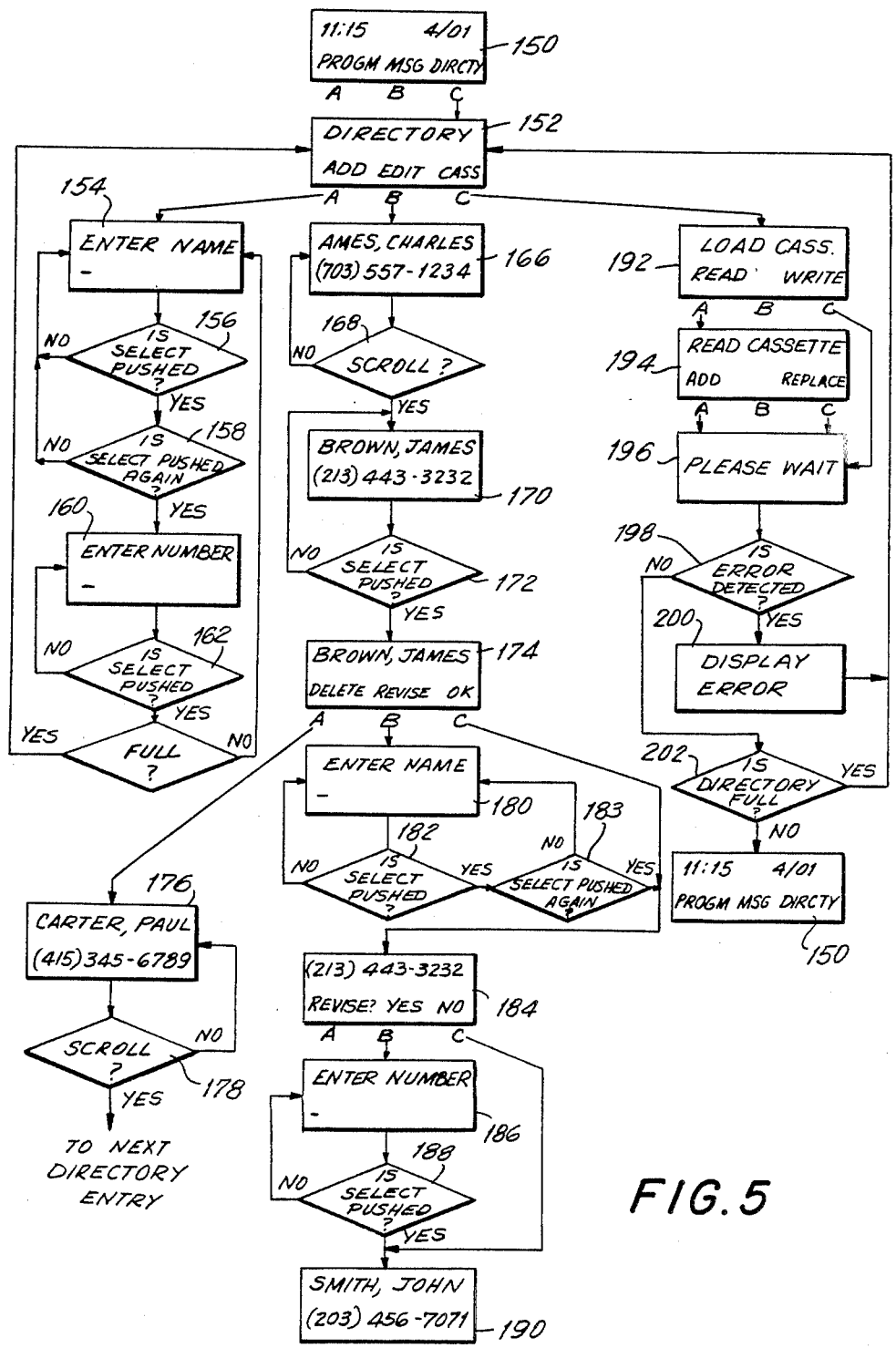
FIG. 5 is a flow chart which is useful in understanding one aspect of the present invention.

Turning now to FIG. 5, there is illustrated a flow chart representing the manner in which telephone number information may be manually generated and supplied to write circuitry 138 for storage in memory 110, and also the manner in which stored telephone number information may be edited. The flow chart of FIG. 5 also represents the manner in which a directory listing uploading or downloading operation is selected. It will be appreciated that the microprocessor included in terminal 10 may be programmed by one of ordinary skill in the art to implement the flow chart shown in FIG. 5.

Initially, a basic display 150 is displayed by display 16 of terminal 10. This basic display indicates the present time of day and date. In addition, the basic display provides, in alignment with soft keys A, B and C, respective functions which may be selected by the actuation of respective ones of these soft keys. The basic display permits a user to select a programming mode of operation by actuating soft key A, a telephone message set-up operation by actuating soft key B, and a telephone directory creating/editing/downloading/uploading operation by actuating soft key C. The programming mode and message set-up operations are described in aforementioned copending application Ser. No. 895,017.

It is assumed that, in response to basic display 150, the user actuates soft key C. As a result, prompt message 152 is displayed, informing the user that the directory mode of operation has been established and inviting the user to proceed in a manner so as to add additional telephone number information to the existing directory listing stored in memory 110, to edit the telephone number information stored in the memory or to effect an uploading or downloading operation by recording on or reproducing from a magnetic tape cassette Any one of these operations may be selected by actuating a respective one of soft keys A, B and C when prompt message 152 is displayed. Let it be assumed that the user now actuates soft key A for the purpose of adding telephone number information to the existing directory listing.

In response to the actuation of soft key A, the routine carried out by the microprocessor advances from prompt message 152 to prompt message 154. This message invites the user to enter the name of an individual whose telephone number is to be stored in memory 110. The name is entered by actuating selected ones of keys "2"–"9" of keypad 24, resulting in the entry of selected alphabetic characters to spell out the desired name. As each alphabetic character is entered, it is displayed on display 16 as the bottom line of prompt message 154. As is conventional, each of keys "2"–"9" bears indicia not only of a respective numeral but also of three separate letters, as noted above. However, keypad actuation is operable in two separable modes, or states. The first mode, or state, is established initially when telephone number information is to be added to the directory listing stored in memory 110. In this first mode or state, the actuation of any one of keys "2"–"9" results in the generation of a digital signal representing a selected one of the letters associated with the actuated key. More particularly, upon the first actuation of that key, a digital signal representing the first letter indicated thereon is generated. Upon the second actuation of that key, a digital signal representing the second letter indicated thereon is generated. Upon the third actuation of that key, a digital signal representing the third letter indicated thereon is generated. Should this key then be reactuated, successive letters (indicated on the next-following key) are represented. Thus, depending upon the number of times a key is actuated in succession, the resultant alphabetic character is digitally generated in response thereto:

| Key | Actuation | | | |
|---|---|---|---|---|
| | 1st Time | 2nd Time | 3rd Time | 4th Time |
| 2 | A | B | C | D |
| 3 | D | E | F | G |
| 4 | G | H | I | J |
| 5 | J | K | L | M |
| 6 | M | N | O | P |
| 7 | P | Q | R | S |
| 8 | T | U | V | W |
| 9 | W | X | Y | Z |

The actuation of a key results in the display of a corresponding alphabetic letter, as aforementioned, and the digital character representing this letter is stored temporarily in, for example, a buffer. As the key is reactuated, or in the event that another key is actuated, the displayed letter changes accordingly, and the digital signal stored in the aforementioned buffer is replaced by a new, properly representative digital signal If the user is satisfied with the displayed alphabetic character, that is, if the user wishes to enter the displayed character as part of the name which he is spelling out, he need merely actuate the SELECT key included in function keys 26. The actuation of this SELECT key functions as an "enter" key to enter the corresponding digital signal into, for example, a memory write-in buffer. As illustrated in the flow chart of FIG. 5, after displaying prompt message 154, the routine inquires, at 156, if the SELECT key has been pushed. If the answer to this inquiry is in the negative, the routine merely cycles through the loop formed of prompt message 154 and inquiry 156, thus permitting the user to select any alphabetic character which he wishes. However, if inquiry 156 is answered in the affirmative, the routine advances to inquire, at 158, if the SELECT key has been pushed once again.

If inquiry 158 is answered in the negative, the routine returns to prompt message 154, thus permitting the user to enter additional letters and spell out an individual's name. Each time the SELECT key is actuated, the letter displayed in prompt message 154 is entered into the aforementioned memory write buffer. If an erroneous letter is entered, it can be erased simply by actuating the BACK key. For convenience, the user may spell out a name in the format last name first, first name last, and a comma or space may be entered therebetween by actuating key "0", as mentioned above, followed by actuation of the SELECT key. However, the particular format adopted by the user may vary as he desires. It is recalled that, in the preferred embodiment, up to 16 alphabetic characters may be entered to spell out a name. Once the user is satisfied with the name which he has entered, he need merely reactuate the SELECT key (that is, it is appreciated that the user will actuate the SELECT key a first time to enter the last letter of a name and then he need merely reactuate that SELECT key) whereupon the mode, or state of operation is changed over such that the subsequent actuation of keypad 24 results in the entry of numerals. Thus, if inquiry 158 is answered in the affirmative, the routine advances to display prompt message 160.

Prompt message 160 is similar to aforedescribed prompt message 154 and invites the user to actuate any one of keys "1"–"0" to enter the numerical characters which constitute the desired telephone number. It will be appreciated, in the preferred embodiment, up to a maximum of 16 numerical characters may be entered. Of course, any desired number of characters which does not exceed 16 may be used, for example, less than 7 characters may represent an intra-office extension, 7 characters may represent a local telephone number, 10 characters may represent a long-distance telephone number, and greater than 10 characters may be used for various requirements of individual PBX systems, computerized call routing systems, and the like.

Each time a key of keypad 24 is actuated, the numerical character indicated on that key is entered into, for example, the memory write buffer. It is appreciated, therefore, that the entry of numerical characters differs from the entry of alphabetic characters in that the SELECT key need not be actuated after each digit has been selected. However, since the number of digits which comprise the desired telephone number may vary, the actuation of the SELECT key is used to identify when all of the desired digits have been entered. Accordingly, and as illustrated in FIG. 5, after prompt message 160 is displayed, the routine advances to inquiry 162 to ascertain when the SELECT key has been pushed. If inquiry 162 is answered in the negative, the routine merely cycles through the loop formed of prompt message 160 and inquiry 162 until this inquiry is answered in the affirmative. At that time, the routine advances to inquire, at 164, if the telephone number storage capacity of memory 110 has been reached. It is recalled that, in the preferred embodiment, up to 100 entries, or record blocks, may be stored in memory 110. If this memory is "full", inquiry 164 is answered in the affirmative, display 16 indicates "full" and the routine returns to prompt message 152. That is, further entries of telephone number information may not be added until existing entries are deleted. However, if inquiry 164 is answered in the negative, the routine returns to prompt message 154 to enable the user to create yet another telephone number entry. In one embodiment, if no telephone number entries had been stored in memory 110, display 16 first indicates "empty".

Although not shown in FIG. 5, it will be appreciated from copending application Ser. No. 895,017 that the actuation of the STOP key causes the microprocessor to return to basic display 150, thereby exiting the telephone directory routine. It is anticipated that the STOP key will be actuated when the user no longer wishes to add additional entries into memory 110.

Let it be assumed that, in response to prompt message 152, the user actuates soft key B to enter an edit mode of operation. In this mode, the user may review all or selected ones of the telephone number entries stored in memory 110 and he may revise individual entries, such as when the telephone number of an individual has been changed, or he may delete individual entries. In response to the actuation of soft key B, the routine advances to message 166 which displays the name and associated telephone number of the directory listing stored in memory 110 which had been last accessed in a previous operation. If there had been no prior use of terminal 10, the first name (in alphabetical order) is displayed. The routine then advances to inquiry 168 to determine if the user has actuated a suitable key to scroll through the directory entries. The user may scroll in the forward direction merely by actuating any one of keys "2"–"9", resulting in the display at message 166 of the first name (in alphabetical order) of the first letter indicated on the selected key. Alternatively, if the key inscribed with a letter corresponding to the first letter of the name which is displayed by message 166 is actuated, the next entry stored in memory 110 which follows, alphabetically, the displayed entry is displayed. For example, if key "2" is actuated, display 166 changes over to display, for example, the telephone number information associated with "Brown, James", assuming such an entry exists. If key "2" is actuated once again, the display may change over to display telephone number information associated with "Bush, George". Further actuation of key "2" effects a similar scroll forward operation, and in the preferred embodiment, once all of the entries which begin with the letters "A", "B" and "C" have been displayed, further actuation of this key results in the display of telephone number information associated with the next set of letters (D, E and F), and so on.

Let it be assumed that, while prompt message 166 is displayed, the user actuates key "5". Assuming telephone number entries beginning with the letters J, K or L are stored, the actuation of key "5" results in the display of telephone number information associated with "Jones, Tom". If key "5" is actuated once again, the next directory entry beginning with the letter "J" is displayed, for example, telephone number information associated with "Judson, Paul" This forward scrolling operation is repeated so as to scroll through the remaining telephone entries beginning with the letter "J", followed by the letter "K", followed by the letter "L", and so on.

It also is appreciated that a backward scrolling operation may be carried out merely by actuating the BACK key included in function keys 28. Such backward scrolling is carried out in reverse alphabetical order, sequentially from one name to the next.

As illustrated in FIG. 5, when a directory entry is displayed, as represented by display 166, inquiry 168 is made to determine if the aforementioned forward or backward scrolling operation has been selected If this inquiry is answered in the negative, display 166 is retained. However, if inquiry 168 is answered in the affirmative, the next successive directory entry, either in the forward or backward direction, is retrieved from memory 110 and displayed on display 116. This is represented by display 170 in FIG. 5. If a scrolling operation is continued, the next successive directory entry is displayed, and this operation continues for so long as an appropriate scrolling key (i. e. any one of keys "2"–"9" or the BACK key) is actuated.

When a directory entry is displayed at 170, inquiry 172 is made to determine if the SELECT key has been pushed. If not, display 170 is retained, and the aforementioned forward or backward scrolling operation may continue in response to the actuation of an appropriate one of the scrolling control keys. However, if inquiry 172 is answered in the affirmative, prompt message 174 is displayed. This prompt message displays the name of the individual whose directory entry was last retrieved from memory 110 and, additionally, invites the user to delete that entry, by actuating soft key A, to revise that entry by actuating soft key B, or to retain that entry by actuating soft key C. Let it be assumed that the directory entry associated with the name displayed by prompt message 174 is to be deleted Soft key A is actuated the directory name and number are deleted, and the routine advances to display 176. This display indicates the next sequential directory entry stored in memory 110 In the present example, it is assumed that the following directory entries are stored in sequential, alphabetic order:

Ames, Charles
Brown, James
Carter, Paul

If the user wishes to delete the telephone number information (and, thus, the directory entry) of "Brown James", the next sequential directory entry, "Carter Paul" is displayed, together with the telephone number associated with this individual. This display, shown as 176 in FIG. 5, is similar to display 166. Hence, the routine then advances to inquiry 178 to determine if the user has actuated a forward or backward scrolling key. If this inquiry is answered in the negative, display 176 is retained. However if inquiry 178 is answered in the affirmative, the next sequential directory entry is displayed; and the aforementioned operation represented by display 170 and inquiry 172, is repeated.

Let it be assumed that, in response to prompt message 174, the user wishes to revise the name in this directory entry. Accordingly, soft key B is actuated, resulting in the display of prompt message 180 It will be appreciated that prompt message 180 is similar to aforedescribed prompt message 154, and invites the user now to enter the appropriate name of the individual. Normally, it is expected that the same name will be entered, but corrections in spelling or name changes (e. g. a change in the name of a company) will be effected. As was the case when alphabetic characters were entered to spell out a name when creating a directory entry, keys "2"–"9" are actuated to spell out a new or corrected name which will be displayed as the bottom line in prompt message 180. Inquiry 182, similar to aforedescribed inquiry 156, is made to determine if the SELECT key is pushed and, if this inquiry is answered in the affirmative, inquiry 183, similar to aforedescribed inquiry 158, is made to determine if the SELECT key is pushed once again. If so, the routine advances to prompt message 184.

Prompt message 184 displays the telephone number associated with the individual whose name is displayed in prompt message 174; and prompt message 184 additionally invites the user to revise this displayed telephone number, if desired. It is appreciated that, if soft key C had been actuated when the prompt message 174 was displayed, that is, if the user was satisfied with the name of the individual then being displayed but wished to check on or revise the telephone number associated with that individual, prompt message 184 (in place of prompt message 180) would have been displayed. Assuming prompt message 184 is displayed, if the user wishes to revise the displayed telephone number, soft key B is actuated. As a result, prompt message 186, inviting the user to enter the revised telephone number is displayed. It is appreciated that prompt message 186 is similar to aforedescribed message 160 which was displayed during the creation of a directory entry. As before, inquiry 188 is made periodically to determine whether the SELECT key is pushed. Once the user enters the desired, revised telephone number, which is displayed at the bottom line of prompt message 186, it is expected that he will actuate the SELECT button, and inquiry 188 is answered in the affirmative. The routine then advances to display message 190, that is, the newly entered name and telephone number is displayed. It is appreciated that message 190 is a display of the revised telephone number information.

As shown in FIG. 5, if, while prompt message 184 is displayed, the user is satisfied that the displayed telephone number should not be revised, soft key C is actuated and, as a result, message 190 will display the newly entered name, or if the name has not been changed, the same name that was displayed in prompt message 174, and the newly entered telephone number associated with that name or, if the telephone number has not been changed, message 190 merely displays the same telephone number that was displayed in prompt message 184.

Thus, it is seen that telephone number information may be reviewed by scrolling through the directory entries stored in memory 110, a stored directory entry may be selected for deletion or revision, and then the name and/or telephone number of the selected directory entry may be revised. The revised directory entry then is displayed as message 190 and is stored in memory 110.

Let it now be assumed that, when the directory mode has been entered, resulting in the display of prompt message 152, a directory listing uploading or downloading operation is desired. This operation is selected by actuating soft key C, whereupon the routine advances from prompt message 152 to prompt message 192. It is assumed, for the purpose of the present description, that the uploading or downloading operation is carried out in conjunction with a magnetic tape cassette. Prompt message 192 directs the user to load a cassette into record/playback module 50. The user then is invited to select either a downloading operation, by actuating soft key A (whereupon the directory listing recorded on the magnetic tape is read therefrom) or to select an uploading operation by actuating soft key C (whereupon directory information is written onto the magnetic tape). Let it be assumed that a downloading operation is desired, and soft key A is actuated.

Prompt message 194 is displayed in response to the actuation of soft key A. This message indicates that the information stored on magnetic tape 125 (FIG. 4) is being read therefrom. The user is invited to store in memory 11 the entire directory listing from tape 125, that is, to replace the existing directory listing stored in the memory with the downloaded directory listing, or merely to add directory entries (or record blocks) into memory 110 which are not presently stored therein. The replacement operation is selected by actuating soft key C and the entry-addition operation is selected by actuating soft key A. In response to the actuation of either one of these soft keys, the downloading operation is carried out. Since this operation has been discussed in detail hereinabove in conjunction with FIG. 4, further description thereof is not provided. It will be recognized that when an entry-addition operation is selected, a comparison is made between each entry read from tape 125 and the entries stored in memory 110. Only those entries which are not found in memory 110 are written thereinto.

While record blocks are read from tape 125 and written into memory 110, the routine advances to display message 196. This message notifies the user that the selected downloading operation is being carried out and he is requested to await its completion.

In the event that an uploading operation was selected, that is, if soft key C had been actuated while prompt message 192 was displayed, the uploading operation described above is carried out. As record blocks are read from memory 110 and recorded on tape 125, the user is apprised of the fact that this operation is being carried out by reason of the display of message 196.

After a downloading or uploading operation is completed, inquiry 198 is made to determine if an error was detected. The detection of an error has been described above in conjunction with FIG. 4. It is recalled that, during an uploading operation, error detector 116 (FIG. 4) detects if an error is present in a record block transferred from memory 110 to buffer 118 and thence to modulator 120. During a downloading operation, error detector 130 detects an error in both of the duplicate directory listings reproduced from magnetic tape 125, and error detector 136 detects an error in a record block intended to be written into memory 110. Inquiry 198 is answered in the affirmative if an error is detected by error detector 116 or by error detector 130 or by error detector 136. Then, the routine advances to display an error indication, as represented by instruction 200. After an error indication is displayed, the routine returns to prompt message 152 to invite the user to repeat the uploading or downloading operation or, if he desires, to carry out a directory addition or directory editing mode of operation.

If inquiry 198 is answered in the negative, that is, if an error is not detected in the uploading or downloading operation, the routine advances to inquiry 202 to determine if the capacity of memory 110 is filled with directory entries. If inquiry 202 is answered in the affirmative, the routine returns to prompt message 152. Hence, a directory entry editing mode of operation, or another uploading or downloading operation may be carried out. However, if inquiry 202 is answered in the negative, the routine returns to basic display 150. The user then may enter the directory mode, as discussed above, or he may select the programming mode or telephone message setup mode of operation, as disclosed in application Ser. No. 895,017.

In the foregoing description of creating and editing directory entries, it has been assumed that, initially, the name of an individual is created and entered and then, upon the dual actuation of the SELECT key, the entry mode is changed over to permit the creation and entry of a telephone number associated with that name. It is appreciated that, if desired, the order in which this telephone number information is created and entered may be reversed. That is, the telephone number first may be created and entered and then, upon the actuation of the SELECT key, the name of an individual may be created and entered. Also, if desired, a separate mode establishing key may be provided on terminal 10 to change over the mode of operation from creating and entering a name to creating and entering a telephone number. Still further, a separate memory entry key may be provided which, upon actuation, enters into memory 110 the telephone number information (i.e. the name and telephone number) which was created. In this regard, digital signals representing a name and digital signals representing a telephone number associated with that name may be stored temporarily in a buffer until such a memory entry key is actuated.

As mentioned above, and as described more fully in application Ser. No. 895,010, terminal 10 may be connected in a network having a central store in which are stored the directory listings of each terminal connected in the network. One or more directory entries stored in memory 110 of any one of terminals 10 may be modified or deleted (erased) by operating a keyboard, for example, coupled to the central store. Furthermore, by operation of that keyboard, a complete directory listing that had been derived from one of terminals 10 may be "copied" into any other desired terminal.

As mentioned in application Ser. No. 895,017 each terminal 10 is connected by a digital link, such as a digital data bus, to the central store. In a preferred embodiment, this digital link comprises a simple two-wire twisted pair.

Figure 6:
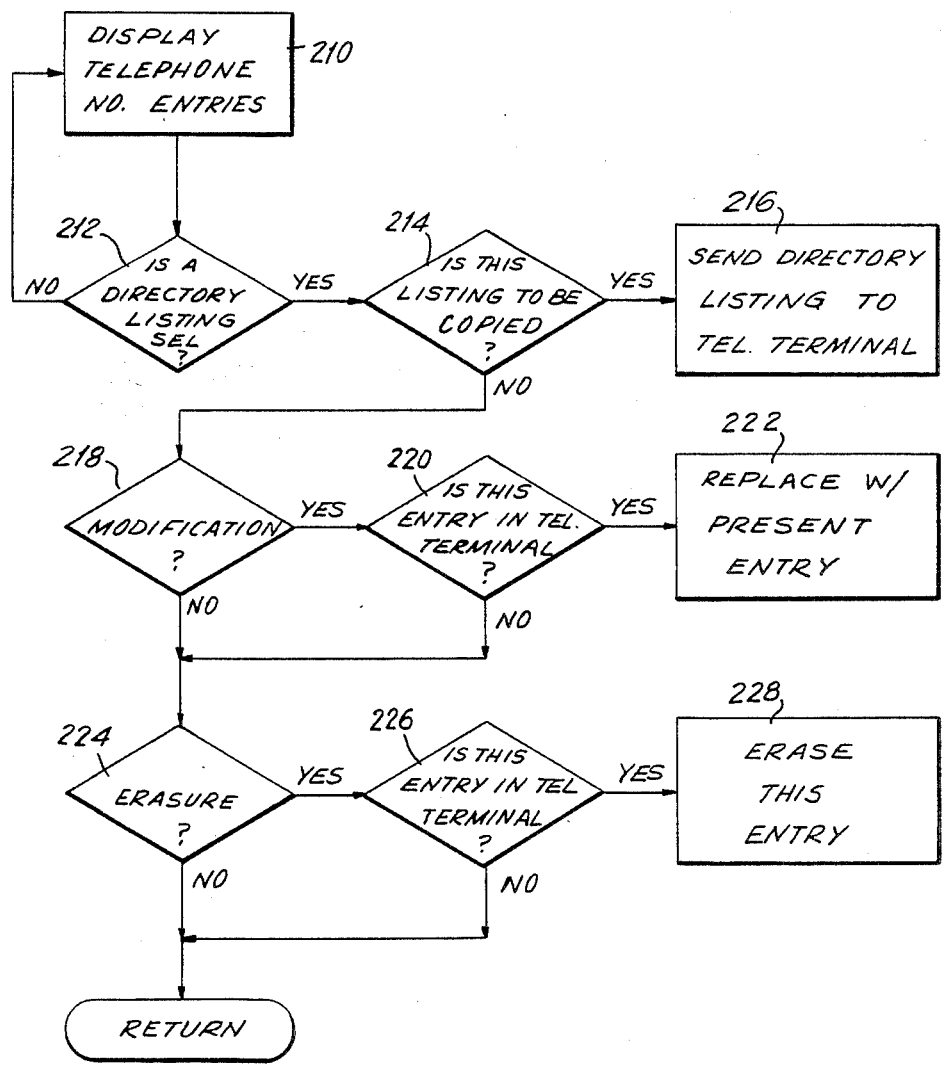
FIG. 6 is a flow chart which is useful in understanding the operation of another aspect of this invention.

FIG. 6 is a flow chart representing the routine carried out at the microcomputer of the central store to effect a modification, erasure or "copy" of directory entries. As described in application Ser. No. 895,010 the microcomputer at the central store is menu driven to facilitate easy operation of the various microcomputer routines by supervisory personnel. One of these routines is a telephone directory manipulation routine.

As shown in FIG. 6, the telephone number entries which are stored at the central store may be displayed as represented by instruction 210. This display may be selected by the supervisory operator such that all of the stored telephone number entries are displayed in alphabetical order or, alternatively, all of the stored telephone number entries that were derived from a selected one of the terminals connected in the network may be displayed in alphabetical order. It is, of course, appreciated that each telephone number entry is displayed as a name and a telephone number associated with that name. It is further understood that all of the stored telephone number entries are not displayed at one time. Rather, it typically will be necessary for the supervisory operator to scroll through the stored telephone number entries until the desired one or ones are observed.

Inquiry 212 first is made as to whether the supervisory operator has selected a directory listing for manipulation. This inquiry is answered in the affirmative if the operator wishes to copy a complete directory listing into one of terminals 10 or if the operator wishes to modify or erase one or more entries from a particular directory listing. If inquiry 212 is answered in the affirmative, inquiry 214 is made to determine if this selected directory listing is to be copied into a terminal. If inquiry 214 is answered in the negative, the routine advances to inquiry 218. However, if inquiry 214 is answered in the affirmative, instruction 216 is carried out and the digital signals which comprise the respective record blocks that constitute the selected directory listing are transmitted over the digital link to the particular terminal 10 which the supervisory operator has selected to receive this directory listing.

If inquiry 212 is answered in the negative, the routine returns to instruction 210 to await the selection of a directory listing manipulation command or other command to operate upon the displayed telephone number entries.

If inquiry 214 is answered in the negative, the routine advances to inquire, at 218, if a modification is to be made to a telephone number entry included in the selected directory listing. If this inquiry is answered in the negative, the routine advances to inquiry 224. However, assuming that inquiry 218 is answered in the affirmative, that is, a particular telephone number entry is to be modified, the routine advances to inquiry 220.

Inquiry 220 ascertains if the telephone number entry which is to be modified is stored in memory 110 in any of the terminals 10 connected in the network. If this inquiry is answered in the affirmative, the telephone number entry stored in memory 110 of those terminals is replaced with the modified telephone number entry. Thus, changes in names or telephone numbers may be effected at the central store, and digital signals representing the modified telephone number information then is transmitted over the digital link to the appropriate terminals so as to update such telephone number information therein.

If inquiry 218 or inquiry 220 is answered in the negative, the routine advances to inquire, at 224, if a particular telephone number entry included in the selected directory listing is to be erased. If this inquiry is answered in the affirmative, the routine advances to inquiry 226 which ascertains if the telephone number entry to be erased also is stored in any one or more of the terminals 10 connected in the network. If inquiry 226 is answered in the affirmative, this telephone number entry is deleted from each memory 110 wherein it is stored, as represented by instruction 228. Thus, the supervisory operator at the central store may delete selected telephone number information from desired ones of memories 110 in terminals As shown in FIG. 6, if inquiry 224 or inquiry 226 is answered in the negative, the routine returns either to a routine which had been carried out previously or to some other routine established by the protocol in the programmed microcomputer.

The communication of digital signals representing telephone number entries may be transmitted between the central store and selected ones of terminals 10 included in the network in the manner described in application Ser. No. 895,010 as well as in application Ser. No. 895,017.

While the present invention has been particularly shown and described with reference to a preferred embodiment, it will be readily appreciated by those of ordinary skill in the art that various changes and modifications may be made without departing from the spirit and scope of the invention. It is, therefore, intended that the appended claims be interpreted as including not only the embodiment described herein but also equivalents thereof.

What is claimed is:

1. Automatic telephone dialing apparatus for dialing telephone numbers represented by telephone number information stored therein, comprising:

memory means for selectively and alterably storing a plurality of items of said telephone number selection means for selecting one of said items from said memory means;

display means responsive to said selection means an said memory means for displaying at least a portion of said selected item;

read out means for responsive to said selection means said memory means, and a user input to read out from said memory means at least portion of said selected item corresponding to a telephone number and for effecting a dial-out operation for said corresponding telephone number;

playback means for playing back from a record medium a selected plurality of items of telephone number information; and, write means for writing said selected plurality of items into said memory means, whereby a previously selected plurality of stored items may be altered.

2. Automatic telephone dialing apparatus as described in claim 1 further comprising recording means for recording on said record medium selected ones of said stored items.

3. Automatic telephone dialing apparatus as described in claim 2 wherein said record medium is portable, whereby said record medium may be used to transfer said item of telephone number information between units of said apparatus.

4. Automatic telephone dialing apparatus as described in claim 2 wherein at least one of said items of telephone number information comprises a portion corresponding to a telephone number and a second portion corresponding to text information associated with said number.

5. Automatic telephone dialing apparatus as described in claim 4 wherein said display means is responsive to said selection means to display said text information.

6. Automatic telephone dialing apparatus as described in claim 1 wherein said record medium is portable, whereby said record medium may be used to transfer said items of telephone number information between units of said apparatus.

7. Automatic telephone dialing apparatus as described in claim 1 wherein at least one of said items of telephone number information comprises a portion corresponding to a telephone number and a second portion corresponding to text information associated with said number.

8. Automatic telephone dialing apparatus as described in claim 7 wherein said display means is responsive to said selection means to display said text information.

9. A method of entering telephone number information into a memory of a telephone dialing device comprising steps of:

reading from a magnetic recording medium said telephone number information;

storing in said memory said telephone number information;

wherein said telephone number information comprises alphabetic characters representing a name and numerical characters representing a telephone number associated with that name; and, wherein said telephone number information is recorded in record blocks on said magnetic recording medium, each record book including a name and an associated telephone number, and all of the recorded record blocks comprising a directory listing, said telephone number information being recorded as duplicate directory listings; and wherein said step of reading said telephone number information includes the steps of detecting errors in the duplicate directory listing which is read first from said recording medium, and reading the second of the duplicate directory listings if an error is detected in the directory listing first read from said recording medium.

10. The method of claim 9 further comprising the steps of detecting errors in the second of the duplicate directory listings read from said recording medium, and providing an error indication if any error is detected in said second of the duplicate directory listings.

11. A method of entering telephone number information into a memory of a telephone dialing device comprising steps of:

reading from a magnetic recording medium said telephone number information;

storing in said memory said telephone number information;

wherein said telephone number information comprises alphabetic characters representing a name and numerical characters representing a telephone number associated with that name; and, wherein said telephone number information is recorded in record blocks on said magnetic recording medium, each record block including a name and an associated telephone number; and wherein said step of storing read telephone number information in said memory comprises:

(i) temporarily storing the record blocks read from said recording medium;

(ii) transferring successive ones of the stored record blocks for loading into said memory;

(iii) detecting errors in each transferred record block; and (iv) repeating steps (ii) and (iii) if an error is detected in a transferred record block.

12. The method of claim 11 wherein steps (ii) and (iii) are repeatedly attempted a predetermined number of times or until no errors are detected in the transferred record block.

13. The method of claim 12 further including the step of providing an error indication if an error still is detected in a record block after a predetermined number of attempts have been made 14. A method of entering telephone number information into a memory of a telephone dialing device comprising steps of:

reading from a magnetic recording medium said telephone number information;

storing in said memory said telephone number information;

wherein said telephone number information comprises alphatic characters representing a name and numerical characters representing a telephone number associated with that name; and, wherein said telephone number information is recorded in the form of a tone signal modulated to represent said alphabetic and numerical characters, and said step of reading further comprises demodulating the tone signal read from said recording medium.

15. The method of claim 14 wherein the alphabetic and numerical characters are represented by digital signals modulated as FSK signals, said FSK signals being read from said recording medium and demodulated to recover the digital signals; and the recovered digital signals are stored in said memory.

16. A method of entering telephone number information into a memory of a telephone dialing device comprising steps of:
reading from a magnetic recording medium said telephone number information;
storing in said memory said read telephone number information;
wherein said telephone dialing device is included in a network having a central store of telephone number information; and further comprising the step of transferring at least selected telephone number information from said central store to said telephone dialing device; and storing in said memory the transferred telephone number information; and
wherein said central store stores the telephone number information that also is stored in said memory of said telephone dialing device, and further comprising the steps of modifying telephone number information in said central store, determining if the unmodified telephone number information also is stored in said telephone dialing device, and replacing said unmodified telephone number information in said memory with the modified telephone number information.

17. The method of clam 16, further comprising the steps of erasing telephone number information from said central store, determining if the erased telephone number information also is stored in said memory of said telephone dialing device, and erasing the last-mentioned telephone number information form said memory.

18. A method of entering telephone number information into a memory of a telephone dialing device for subsequent recall by manual operation of a predetermined key on that device, said method comprising the steps of:
entering a portion of said telephone number information by actuating a telephone dial-type keypad;
actuating a first desired key on said device for assigning said portion of said telephone number information to said first desired key, whereby said portion of said telephone number information is recallable by subsequent actuation of said first desired key;
entering the remainder of said telephone number information by actuating said telephone dial-type keypad and also entering a coded representation of said first desired key; and
actuating a second desired key on said device for assigning said reminder of said telephone number information and said coded representation to said second desired key, whereby the entire telephone number information is recallable by subsequent actuation of only said second desired key.

19. The method of claim 18 wherein said remainder of said telephone number information comprises plural remaining portions, and wherein one of said remaining portions is assigned to said second desired key on said device, and further comprising the step of actuating at least a third desired key on said device for assigning thereto at least a second of said remaining portions of said telephone number information and coded representations of said first and second desired keys, whereby the entire telephone number information is recalled by subsequent actuation of the desired key having assigned thereto the coded representations of those keys to which are assigned portions of said entire telephone number information.

20. A method of entering telephone number information into a memory of a telephone dialing device comprising steps of:
reading from a magnetic recording medium said telephone number information;
storing in said memory said read telephone number information;
wherein said telephone dialing device is included in a network having a central store of telephone number information; and further comprising the step of transferring at least selected telephone number information from said central store to said telephone dialing device; and storing in said memory the transferred telephone number information; and
wherein said network includes plural telephone dialing devices, said central store stores telephone number information that also is stored in the memory of each telephone dialing device, and the telephone number information that also is stored in the memory of a first telephone dialing device is transferred from said central store to the memory of a second telephone dialing device.

21. A method of recording onto a magnetic recording medium telephone number information that is stored in a memory of a telephone dialing device ; comprising the steps of:
reading said telephone number information out of said memory;
modulating a tone signal with the read out telephone number information; and
recording the modulated tone signal on said magnetic recording medium;
wherein said telephone number information is stored as record blocks, each record block comprising a digital representation of a name and a digital representation of a telephone number associated with that name, wherein all of the record blocks stored in said memory comprises a directory listing, and wherein said step of recording comprises recording two duplicate directory listings represented by the modulated tone signal; and
wherein said step of reading comprises reading a record block from said memory; supplying a record block to a tone modulating means; detecting an error in the supplied record block; repeatedly supplying said record block to said tone modulating means no more than a predetermined number of times if an error is detected; and indicating the presence of an error if an error still is detected after said record block has bee repeatedly supplied.

22. The method of claim 21 wherein said step of recording includes recording a record block represented by said modulated tone signal if an error is not detected in that record block or in a repeat record block supplied to said tone modulating means.

23. The method of claim 22 further comprising the steps of acknowledging receipt by said tone modulating means of a record block; and inhibiting the supply of a further record bock to said tone modulating means until receipt of a preceding record block is acknowledged.

24. Automatic telephone dialing apparatus for dialing telephone numbers represented by telephone number information stored therein, comprising:
- memory means for storing said telephone number information;
- read out means for reading out from said memory means selected telephone number information for effecting a dial-out operation;
- manually operable input means for creating telephone number information;
- playback means for playing back from a record medium telephone number information previously recorded thereon; and
- write means for writing into said memory means the telephone number information created by said manually operable input means or the telephone number information played back by said playback means; and,
- wherein said telephone number information is recorded as modulated tone signals on said record medium.

25. The apparatus of claim 24 wherein said playback means includes demodulator means for receiving the modulated tone signals played back from said record medium and producing demodulated digital signals therefrom.

26. The apparatus of claim 25 further comprising means for supplying the demodulated digital signals from said demodulator means to said write means.

27. Automatic telephone dialing apparatus for dialing telephone numbers represented by telephone number information stored therein, comprising:
- memory means for storing said telephone number information;
- read out means for reading out from said memory means selected telephone number information for effecting a dial-out operation;
- manually operable input means for creating telephone number information;
- playback means for playing back from a record medium telephone number information previously recorded thereon; and
- write means for writing into said memory means the telephone number information created by said manually operable input means or the telephone number information played back by said playback means; and
- wherein said telephone number information is represented by digital signals stored in said memory means; wherein said read out means is additionally operable to read out said digital signals from said memory means for effecting a recording operation; and wherein said recording means includes tone modulating means for modulating a tone signal with the digital signals read out from said memory means, whereby said telephone number information is recorded as modulated tone signals.

28. The apparatus of claim 27 wherein said recording means includes means for recording two duplicate directory listings on said record medium, each directory listing being comprised of substantially all of the telephone number information stored in said memory means, and each directory listing being recorded as modulated tone signals.

29. The apparatus of claim 28 wherein said telephone number information is stored in said memory means as individual record blocks, each record block representing a respective telephone number; wherein said read out means reads out one record block at-a-time from said memory means; and further comprising means for supplying each read out record block to said tone modulating means.

30. The apparatus of claim 29 further comprising error detecting means for detecting an error in a record block supplied to said tone modulating means; means for causing said means for supplying to re-supply that record block to said tone modulating means no more than a predetermined number of times until an error is not detected therein; and means for providing an error indication if said record block has been re-supplied said predetermined number of times and an error still is detected therein.

31. Automatic telephone dialing apparatus for dialing telephone number represented by telephone number information stored therein, comprising;
- memory means for storing said telephone number information;
- read out means for reading out form said memory means selected telephone number information for effecting a dial-out operation;
- manually operable input means for creating telephone number information;
- playback means for playing back from a record medium telephone number information previously recorded thereon; and
- write means for writing into said memory means the telephone number information created by said manually operable input means or the telephone number information played back by said playback means;
- wherein said telephone number information is recorded as modulated tone signals on said record medium;
- wherein said playback means includes demodulator means for receiving the modulated tone signals played back from said record medium and producing demodulated digital signals therefrom;
- further comprising means for supplying the demodulated digital signals from said demodulator means to said write means; and
- wherein said telephone number information comprises a directory listing and duplicate directory listings are recorded on said record medium; wherein said playback means plays back a first of the duplicate directory listings form said record medium; and wherein said means for supplying includes error detecting means for detecting the presence of an error in the directory listing played back from said record medium and means for causing said playback means to play back a second of the duplicate directory listings from said record medium if an error is detected.

32. The apparatus of claim 31 wherein said error detecting means detects the presence of an error in the second of the duplicate directory listings played back from said record medium; and further comprising means for indicating an error in the event that an error is detected in the first and second duplicate directory listings played back from said record medium.

33. The apparatus of claim 31 wherein said telephone number information is further recorded as individual record blocks, each record block representing a respective telephone number; and wherein said means for supplying supplies individual record blocks, one record block at-a-time, to said write means, and further includes means for sensing an error in a record block, means for re-supplying that record block to said write means no more than a predetermined number of times until an error is not sensed therein, and means for providing an error indication if said record block has been re-supplied said predetermined number of times and an error still is sensed therein.

34. In a telephone system having a plurality of telephone terminals and a central store of telephone number information, said central store being coupled to said telephone terminals, and each telephone terminal including automatic telephone dialing apparatus for dialing telephone numbers represented by telephone number information stored in said telephone dialing apparatus, the combination comprising:
  memory means in said telephone terminal for storing said telephone number information;
  read out means for reading out from said memory means selected telephone number information for effecting a dial-out operation;
  manually operable input means in said telephone terminal for creating telephone number information;
  playback means coupled to said telephone terminal for playing back from a record medium telephone number information previously recorded thereon;
  write means for writing into said memory means the telephone number information created by said manually operable input means or the telephone number information played back by said playback means; and
  means operable at said central store for revising the telephone number information stored in said memory means.

35. The combination of claim 34 wherein said means at said central store includes transfer means for transferring at least selected telephone number information from said central store to said write means.

36. The combination of claim 35 wherein said means at said central store further includes means for modifying telephone number information stored in said central store; means for determining if said telephone number information prior to modification also is stored in said memory means; and means for controlling said transfer means to transfer to said write means the modified telephone number information for replacing the unmodified telephone number information in said memory means.

37. The combination of claim 36 wherein said means for modifying includes erasure means for modifying telephone number information by erasing that telephone number information from said central store.

38. The combination of claim 35 wherein the telephone number information stored in each memory means comprises a directory listing; wherein said central store stores directory listings of the telephone terminals coupled thereto; and wherein said transfer means includes means for transferring to said write means of a first telephone terminal the directory listing stored in the memory means of a second telephone terminal.

39. A telephone/dictation terminal comprising:
  record/playback means for recording and playing back audio signals on a record medium;
  telephone means coupled to said record/playback means and having handset means for transmitting audio signals to and receiving audio signals from said record/playback means, said handset means additionally being operative by a user to carry on a telephone conversation;
  said telephone means being coupled to a telephone line and including automatic dialing means for dialing predetermined telephone numbers, and further including manually operable key means to generate dialing signals for dialing a telephone number;
  said automatic dialing means comprising:
    memory means for storing telephone number information;
    read out means for reading out from said memory means selected telephone number information for dialing a telephone number represented by the read out telephone number information;
    write means selectively operable for writing into said memory means telephone number information generated in response to the operation of said key means; and
    means coupled to said record/playback means for supplying to said write means telephone number information played back from said record medium.

40. The invention of claim 39 wherein said record/playback means includes means for playing back signals recorded on a magnetic recording medium, and wherein said magnetic medium has recorded thereon signals representing telephone number information.

41. The invention of claim 40 wherein said magnetic recording medium comprises magnetic tape; wherein said record/playback means includes means for receiving said magnetic tape; and wherein said signals representing telephone number information comprise tone signals modulated with digital signals.

42. The invention of claim 41 further comprising demodulating means for demodulating said tone signals to recover said digital signals; means for supplying the tone signals played back from said magnetic tape to said demodulating means; error detecting means for detecting errors in the demodulated digital signals; and means for supplying the demodulated digital signals to said write means if errors are not detected therein.

43. The invention of claim 41 wherein said telephone means includes manually operable means for enabling said write means to write into said memory means the demodulated digital signals applied thereto.

44. A method of entering telephone number information into a memory of a telephone dialing device comprising the alternative steps of:
  (a) actuating a telephone dial-type keypad to generate said telephone number information; or
  (b) reading from a magnetic recording medium said telephone number information;
  and further comprising the step of storing in said memory the generated or read telephone number information;
  (c) wherein said telephone number information comprises alphabetic characters representing a name and numerical characters representing a telephone number associated with that name; and,
  (d) wherein said telephone number information is recorded in record blocks on said magnetic recording medium, each record block including a name and an associated telephone number; and wherein said step of storing read telephone number information in said memory comprises: (i) temporarily storing the record blocks read from said recording medium; (ii) transferring successive ones of the stored record blocks for loading into said memory; (iii) detecting errors in each transferred record block; and (iv) repeating steps (ii) if an error is detected in a transferred record block.

45. The method of claim 44 wherein steps (ii) and (iii) are repeatedly attempted a predetermined number of times or until no errors are detected in the transferred record block.

46. The method of claim 45 further including the step of providing an error indicating if an error still is detected in a record block after a predetermined number of attempts have been made.

47. A method of entering telephone number information into a memory of at telephone dialing device comprising the alternative steps of:
  (a) actuating a telephone dial-type keypad to generate said telephone number information; or
  (b) reading from a magnetic recording medium said telephone number information;
  and further comprising the step of storing in said memory the generated or read telephone number information;
  (c) wherein said telephone dialing device is included in a network having a central store of telephone number information;
  (d) further comprising the step of transferring at least selected telephone number information from said central store to said telephone dialing device; and storing in said memory the transferred telephone number information;
  (e) wherein said central store stores the telephone number information that also is stored in said memory of said telephone dialing device; and,
  (f) further comprising the steps of modifying telephone number information in said central store, determining if the unmodified telephone number information also is stored in said memory of said telephone dialing device, and replacing said unmodified telephone number information in said memory with the modified telephone number information.

48. The method of claim 47, further comprising the steps of erasing telephone number information from said central store, determining if the erased telephone number information also is stored in said memory of said telephone dialing device, and erasing the last-mentioned telephone information from said memory.

49. A method of entering telephone number information into a memory of a telephone dialing device comprising the alternative steps of:
  (a) actuating a telephone dial-type keypad to generate said telephone number information; or
  (b) reading from a magnetic recording medium said telephone number information;
  and further comprising the step of storing in said memory the generated or read telephone number information;
  (c) wherein said telephone dialing device is included in a network having a central store of telephone number information;
  (d) further comprising the step of transferring at least selected telephone number information from said central store to said telephone dialing device; and storing in said memory the transferred telephone number information;
  (e) wherein said network includes plural telephone dialing devices, said central store stores telephone number information that also is stored in the memory of each telephone dialing device, and the telephone number information that also is stored in the memory of a first telephone dialing device is transferred from said central store to the memory of a second telephone dialing device.

50. A method of recording onto a magnetic recording medium telephone number information that is stored in a memory of a telephone dialing device; comprising the steps of:
  reading said telephone number information out of said memory;
  modulating a tone signal with the read out telephone number information; and
  recording the modulated tone signal on said magnetic recording medium; and
  wherein said telephone number information is stored as record blocks, each record block comprising a digital representation of a name and a digital representation of a telephone number associated with that name, wherein all of the record blocks stored in said memory comprises a directory listing, and wherein said step of recording comprises recording two duplicate directory listings represented by the modulated tone signal.

* * * * *